United States Patent
Oner et al.

(10) Patent No.: US 10,910,933 B2
(45) Date of Patent: Feb. 2, 2021

(54) MULTI-TEETH SWITCHED RELUCTANCE MOTOR

(71) Applicant: Enedym Inc., Hamilton (CA)

(72) Inventors: Yasemin Oner, Hamilton (CA); Berker Bilgin, Hamilton (CA); Ali Emadi, Burlington (CA)

(73) Assignee: ENEDYM INC., Hamilton (CA)

( * ) Notice: Subject to any disclaimer, the term of this patent is extended or adjusted under 35 U.S.C. 154(b) by 344 days.

(21) Appl. No.: 16/161,681

(22) Filed: Oct. 16, 2018

(65) Prior Publication Data

US 2019/0190364 A1 Jun. 20, 2019

Related U.S. Application Data

(60) Provisional application No. 62/572,919, filed on Oct. 16, 2017.

(51) Int. Cl.

| H02K 21/22 | (2006.01) |
|---|---|
| H02K 1/24 | (2006.01) |
| H02K 5/167 | (2006.01) |
| H02K 19/10 | (2006.01) |
| H02K 1/14 | (2006.01) |

(52) U.S. Cl.
CPC ............ *H02K 21/227* (2013.01); *H02K 1/146* (2013.01); *H02K 1/24* (2013.01); *H02K 1/246* (2013.01); *H02K 5/1675* (2013.01); *H02K 19/103* (2013.01)

(58) Field of Classification Search
CPC ...... H02K 1/146; H02K 21/227; H02K 1/246; H02K 1/24; H02K 5/1675; H02K 19/103
See application file for complete search history.

(56) References Cited

U.S. PATENT DOCUMENTS

| 4,748,362 A | * | 5/1988 | Hedlund | H02K 19/103 310/168 |
|---|---|---|---|---|
| 4,883,999 A | * | 11/1989 | Hendershot | H02K 19/103 310/216.071 |
| 5,015,903 A | * | 5/1991 | Hancock | H02K 19/103 310/168 |
| 5,111,095 A | * | 5/1992 | Hendershot | H02K 19/103 174/DIG. 19 |

(Continued)

*Primary Examiner* — Jeremy A Luks
(74) *Attorney, Agent, or Firm* — Bereskin & Parr LLP/ S.E.N.C.R.L., S.R.L.

(57) ABSTRACT

Various embodiments are described herein for switched reluctance machine configurations. In at least one embodiment, a switched reluctance machine configured according to the teachings herein comprises an axially extending shaft, an axially extending rotor mounted to the shaft, the rotor having a plurality of salient rotor poles, an axially extending stator disposed coaxially and concentrically with the rotor, the stator having a plurality of salient stator poles protruding radially from the stator towards the rotor poles, a plurality of stator teeth and tooth-tips, and a plurality of electrical coils wound about the stator poles to define a plurality of phases of the switched reluctance machine, where a number of stator poles can be determined according to the following equation and at least one constraint condition:

$$N_s = \frac{N_t \times LCM(N_s, N_r)}{N_r \times N_{ph} \times S}.$$

14 Claims, 18 Drawing Sheets

(56) References Cited

U.S. PATENT DOCUMENTS

| | | | | |
|---|---|---|---|---|
| 5,239,217 A * | 8/1993 | Horst | .................... | H02K 19/103 |
| | | | | 310/51 |
| 5,386,162 A * | 1/1995 | Horst | .................... | H02K 19/103 |
| | | | | 310/51 |
| 5,838,087 A * | 11/1998 | Tang | .................... | H02K 19/103 |
| | | | | 310/168 |
| 6,781,273 B2 * | 8/2004 | Jinupun | ............... | H02K 19/103 |
| | | | | 310/168 |
| 9,742,320 B2 * | 8/2017 | Ye | ............................. | H02P 6/10 |
| 2019/0148998 A1 * | 5/2019 | Oner | ...................... | H02K 1/246 |
| | | | | 310/49.44 |

\* cited by examiner

MULTI-TEETH SWITCHED RELUCTANCE MOTOR

CROSS-REFERENCE TO RELATED CASES

This application claims the benefit of U.S. Provisional Application Ser. No. 62/572,919, filed Oct. 16, 2017, which is incorporated by reference herein.

FIELD OF THE INVENTION

The described embodiments relate generally to switched reluctance machines, and in particular, to a multi-teeth switched reluctance machine.

BACKGROUND

Electric machines convert electrical energy to mechanical energy, or mechanical energy to electrical energy. To accomplish this, electrical machines establish and control electromagnetic fields to create the desired electromagnetic performance.

One variety of electric machines is a switched reluctance machine ("SRM"). A typical SRM includes two basic components, namely i) a stationary component which generates a rotating electromagnetic field, generally referred to as the 'stator'; and ii) a rotating part, generally referred to as the 'rotor'. An advantage of SRM is that there is no excitation source on the rotor.

SRM operates based on varying reluctance. In an SRM, the electromagnetic torque is produced by the magnetic attraction of the steel rotor to steel electromagnets. Enhanced torque performances can be obtained by improving the structure of the stator.

SUMMARY

In one aspect of the disclosure, in at least one embodiment described herein, there is provided a switched reluctance machine comprising: an axially extending shaft; an axially extending rotor mounted to the shaft, the rotor having a plurality of salient rotor poles; an axially extending stator disposed coaxially and concentrically with the rotor, the stator having a plurality of salient stator poles protruding radially from the stator towards the rotor poles, the stator further having a plurality of stator teeth and tooth-tips; and a plurality of electrical coils wound about the stator poles, the plurality of electrical coils including a plurality of separate phase coils defining a plurality of phases of the switched reluctance machine, wherein a number of stator poles is related to a number of rotor poles, a number of stator teeth, a number of stator teeth per stator pole, and a number of phases, according to equation (1) and at least one constraint condition:

$$N_s = \frac{N_t \times LCM(N_s, N_r)}{N_r \times N_{ph} \times S},$$

wherein $$S = \frac{N_t}{N_s},$$

and wherein the at least one constraint condition comprises if $S=2$, then $2N_s+2 \neq N_r$, if $N_{ph}=3$, then $N_t-2 \neq N_r$, and if $N_{ph}=3$ and $S=2$, then $N_t-4 \neq N_r$, wherein $N_s$ is the number of stator poles, $N_r$ is the number of rotor poles, $N_t$ is the number of stator teeth, $N_{ph}$ is the number of phases, $S$ is the number of stator teeth per stator pole, and LCM is the lowest common multiple of number of stator poles and number of rotor poles.

In a feature of that aspect, the at least one constraint condition further comprises if $|N_s-N_r|=2p_1$ and $|N_t-N_r|=2p_2$; $p_1 > p_2$ and $\mod(p1,p2)=0$.

In another feature, where the at least one constraint condition further comprises $GCD(N_s, N_r)=GCD(N_t, N_r)$.

In another feature, the at least one constraint condition further comprises $GCD(N_t, N_r)=$Number of stator pole per phase which is at unaligned position.

In another feature, the at least one constraint condition further comprises $$\left( \frac{360 - \frac{360 \times N_s}{N_r}}{N_s} \right) - \frac{360 \times \beta}{N_r} > \frac{180}{N_s},$$

where $\beta$ is any value between a range of about 0.35 and 0.4 if $N_r > N_t$.

In another feature, the at least one constraint condition further comprises a higher length of gap between adjacent rotor poles of the plurality of rotor poles than an arc length of a stator teeth to maintain an unaligned position.

In a further feature, the at least one constraint condition further comprises a rotor pole arc length and a stator teeth arc length, each being larger than or equal to $$\frac{2\pi}{N_r N_{ph}}$$

to maintain non-overlapping inductance.

In a further aspect, in at least one embodiment described herein, there is provided a method of manufacturing a switched reluctance machine having an axially extending shaft, an axially extending rotor mounted to the shaft, an axially extending stator disposed coaxially and concentrically with the rotor, the rotor having a plurality of salient rotor poles, the stator having a plurality of salient stator poles protruding radially from the stator towards the rotor poles, the stator further having a plurality of stator teeth and tooth-tips, the switched reluctance machine further having a plurality of electrical coils wound about the stator poles to define a plurality of phases of the switched reluctance machine, the method comprising: determining a number of stator poles according to equation (1) and at least one constraint condition $$N_s = \frac{N_t \times LCM(N_s, N_r)}{N_r \times N_{ph} \times S},$$

wherein $$S = \frac{N_t}{N_s},$$

and wherein the at least one constraint condition comprises if S=2, then $2N_s+2 \neq N_r$, if $N_{ph}=3$, then $N_r-2 \neq N_r$, if $N_{ph}=3$ and S=2, then $N_r-4 \neq N_r$, where $N_s$ is a number of stator poles, $N_r$ is a number of rotor poles, $N_t$ is a number of stator teeth, $N_{ph}$ is a number of phases, S is a number of stator teeth per stator pole, and LCM is a lowest common multiple of number of stator poles and number of rotor poles.

In another feature, the at least one constraint condition further comprises if $|N_s-N_r|=2p_1$ and $|N_r-N_r|=2$ $p_2$; $p_1>p_2$ and mod(p1,p2)=0.

In yet another feature, the at least one constraint condition further comprises $GCD(N_s, N_r)=GCD(N_t, N_r)$.

In another feature, the at least one constraint condition further comprises $GCD(N_t, N_r)$=Number of stator pole per phase which is at unaligned position.

In yet another feature, the at least one constraint condition further comprises $$\left(\frac{360 - \frac{360 \times N_s}{N_r}}{N_s}\right) - \frac{360 \times \beta}{N_r} > \frac{180}{N_s},$$

where β is any value between a range of about 0.35 and 0.4 if $N_r > N_t$.

In another feature, the at least one constraint condition further comprises a higher length of gap between adjacent rotor poles of the plurality of rotor poles than an arc length of a stator teeth to maintain an unaligned position.

In yet another feature, the at least one constraint condition further comprises a rotor pole arc length and a stator teeth arc length, each being larger than or equal to $$\frac{2\pi}{N_r N_{ph}}$$

to maintain non-overlapping inductance.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

DRAWINGS

For a better understanding of the various embodiments described herein, and to show more clearly how these various embodiments may be carried into effect, reference will be made, by way of example, to the accompanying drawings which show at least one example embodiment and which will now be briefly described.

Figure 1A:
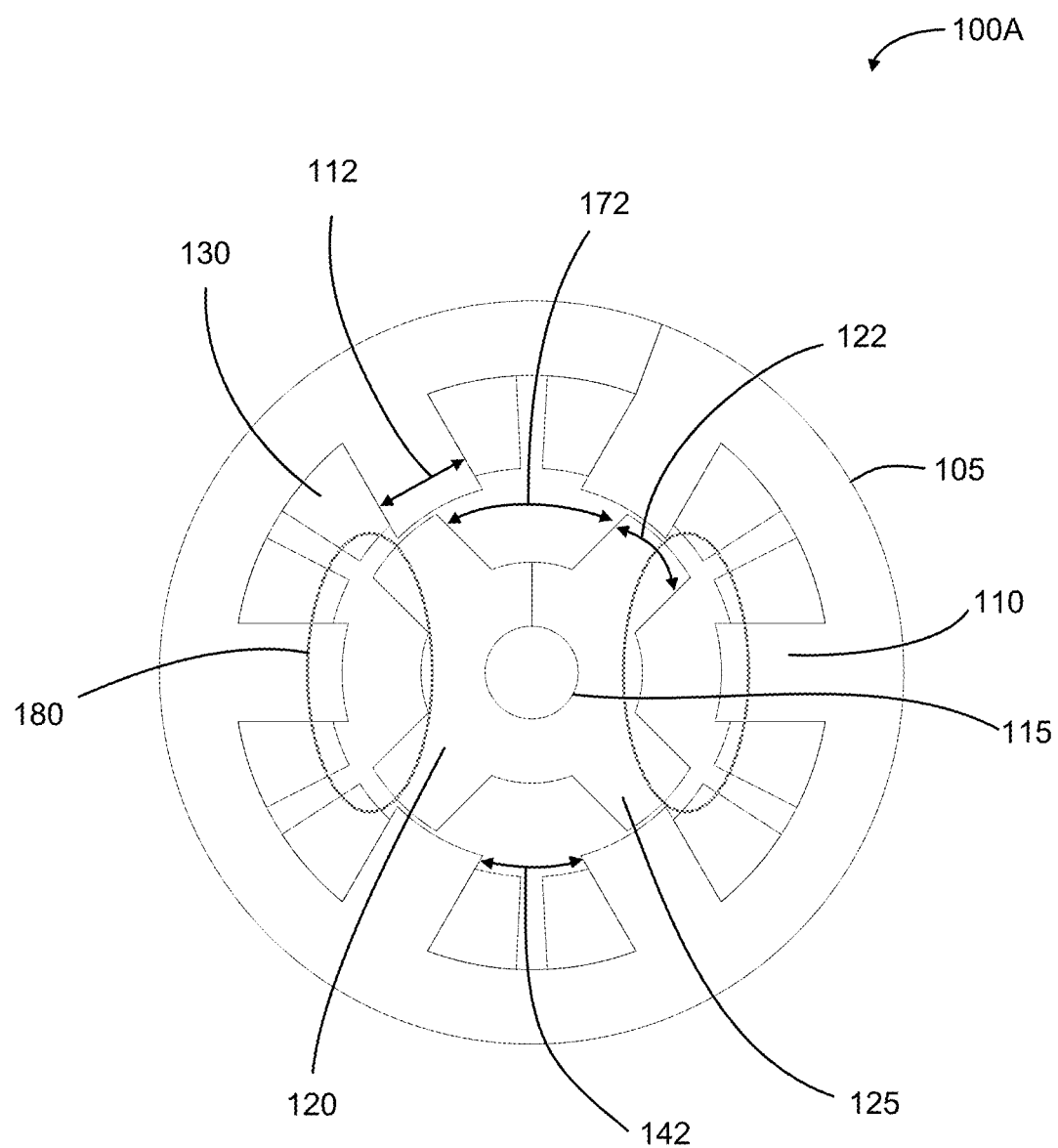
FIG. 1A shows a cross sectional view of a switched reluctance machine according to an example.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. Further, where considered appropriate, reference numerals may be repeated among the figures to indicate corresponding or analogous elements.

DETAILED DESCRIPTION

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

As used in this application, the singular forms "a", "an" and "the" include plural references unless the content clearly dictates otherwise.

In embodiments comprising an "additional" or "second" component, the second component as used herein is physically different from the other components or first component. A "third" component is different from the other, first, and second components, and further enumerated or "additional" components are similarly different.

The term "and/or" as used herein means that the listed items are present, or used, individually or in combination. In effect, this term means that "at least one of" or "one or more" of the listed items is used or present.

Embodiments described herein relate to switched reluctance machines (SRMs). FIG. 1 shows a cross-sectional view of an example three-phase switched reluctance machine 100. The SRM 100 is an example of a switched reluctance machine with six (6) stator poles and four (4) rotor poles. The SRM 100 includes salient poles on the rotor and the stator. The SRM 100 also has concentrated coil windings. The salient pole configuration on both the rotor and the stator provides a relatively simple manufacturing process and robust operation for SRM.

As shown, switched reluctance machine 100 includes a stator 105 and a rotor 120. The rotor 120 is mounted to a rotatable shaft 115. The stator 105 and rotor 120 may be disposed concentrically and coaxially with one another and with the shaft 115. In the SRM 100, the rotor 120 is positioned radially inward of the stator 105.

Both the stator 105 and rotor 120 include a plurality of protrusions that define salient poles. The stator 105 has a stator core that includes a plurality of stator poles 110, in this case six stator poles 110. The rotor 120 includes a plurality of rotor poles 125, in this case four rotor poles 125. The stator poles 110 protrude radially from the stator core towards the rotor 120. Similarly, the rotor poles 125 protrude radially from the rotor 120 towards the stator 105.

The shaft 115 may be positioned within a central bore of the machine 100. As mentioned above, the SRM 100 is an example of a six stator pole and four rotor pole switched reluctance machine with concentrated coil windings. That is, the stator 105 has coil windings 130 around each stator pole 110.

The coils 130 are wound around each stator pole 110 and connected together to create the phase windings for each phase. In an SRM, such as SRM 100, the coils 130 on diametrically opposite stator pole pairs are connected in series or in parallel to form a phase of the machine. SRMs may be designed with varying numbers of stator and rotor poles, and varying number of phases. In general, SRMs typically do not include excitation sources on the rotor 120.

Also shown in FIG. 1A are stator slot angle 142, stator pole angle 112, rotor slot angle 172 and rotor pole angle 122.

In an SRM, such as SRM 100, reluctance torque is the sole torque producing mechanism. When phase windings on the stator poles 110 of SRM 100 are excited with current, the excited pole draws the nearest rotor pole 125 into alignment with it to minimize the reluctance in the phase. In order to create motoring torque, the phases are excited on the rising slope of their inductance profiles.

Figure 1B:
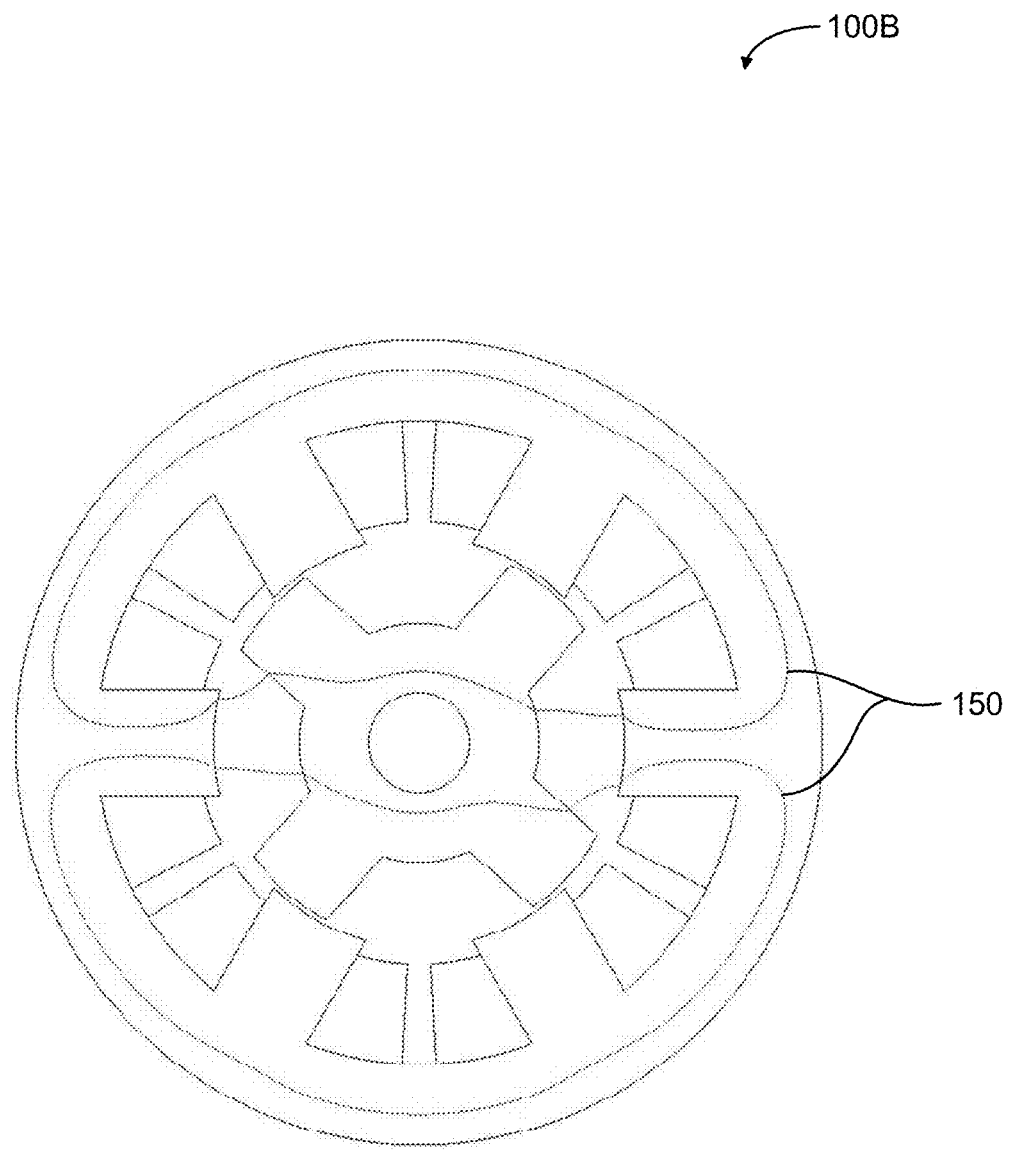
FIG. 1B shows the number of machine periodicity in the switched reluctance machine of FIG. 1A.

As illustrated in SRM 100, the number of stator poles per phase at the unaligned position 180 for a given rotor position is equal to the greatest common divisor (GCD) of the number of stator poles 110 and rotor poles 125 or the machine periodicity 150, shown in SRM 100B of FIG. 1B.

Figure 2:
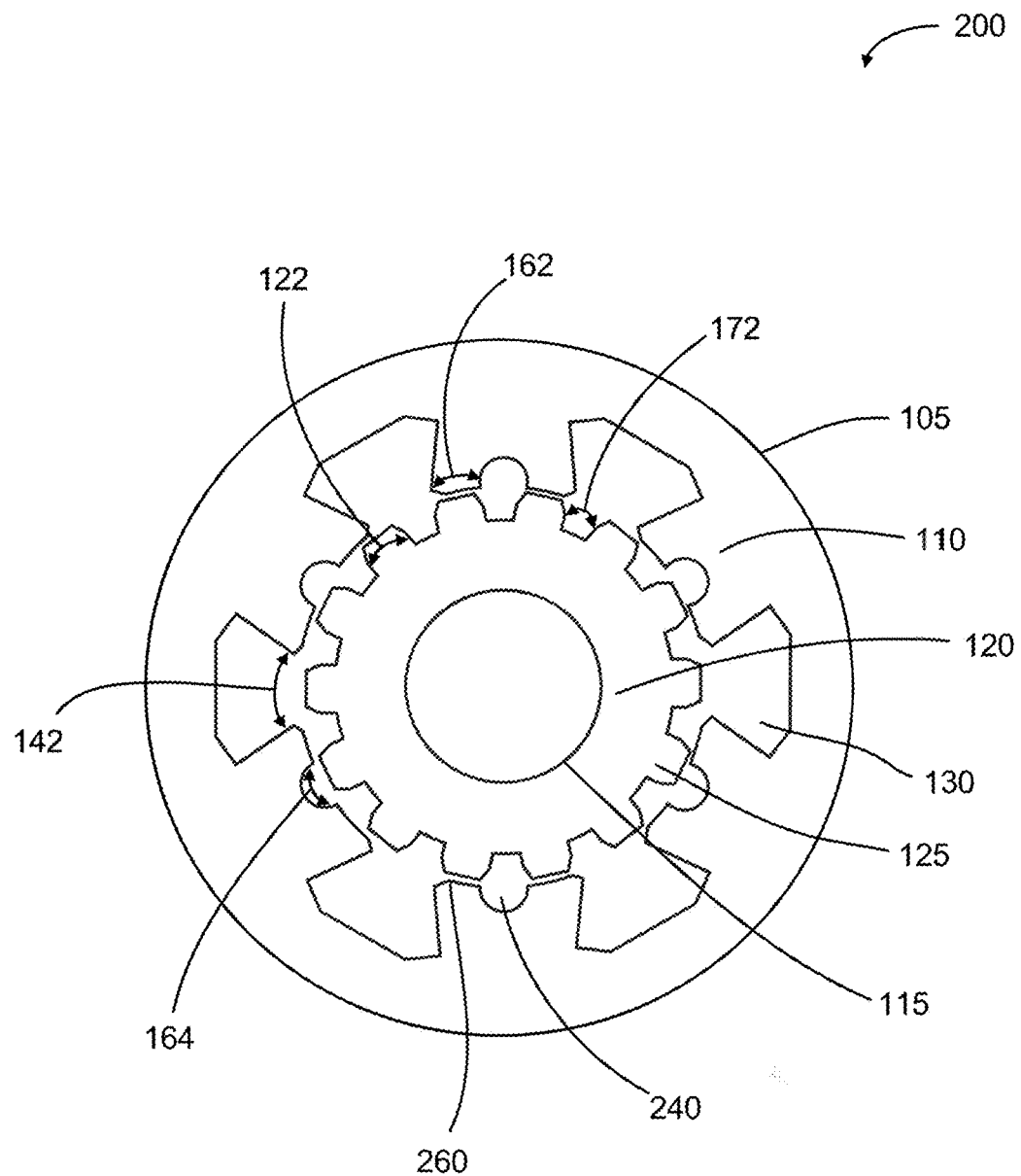
FIG. 2 shows a cross sectional view of a switched reluctance machine according to another example.

Reference is next made to FIG. 2, which shows an example configuration of SRM, such as SRM 200. In particular, FIG. 2 shows a SRM configuration where the stator includes multi teeth per pole. SRM 200 includes six (6) stator poles 110, twelve (12) stator teeth 260 and fourteen (14) rotor poles 125.

As illustrated, each stator pole 110 is generally rectangular in cross sectional shape, and has two stator teeth 260 at its radially innermost end connected by a central longitudinally extending slot 240. In this topology of SRM with bifurcated teeth, with each stator pole 110 having only two teeth 260, the number of stator poles is typically Ns, the number of stator teeth is 2Ns, and the number of rotor poles is 2Ns+2.

While FIG. 2 illustrates a 6/12/14 SRM configuration (in the format: # of stator poles/# of stator teeth/# of rotor poles), other possible SRM configurations include 12/24/26 and 24/48/50 multi-teeth SRMs.

FIG. 2 also shows a stator slot angle 142, a stator teeth angle 162, a teeth opening angle 164, a rotor slot angle 172 and a rotor pole angle 122.

Figure 3:
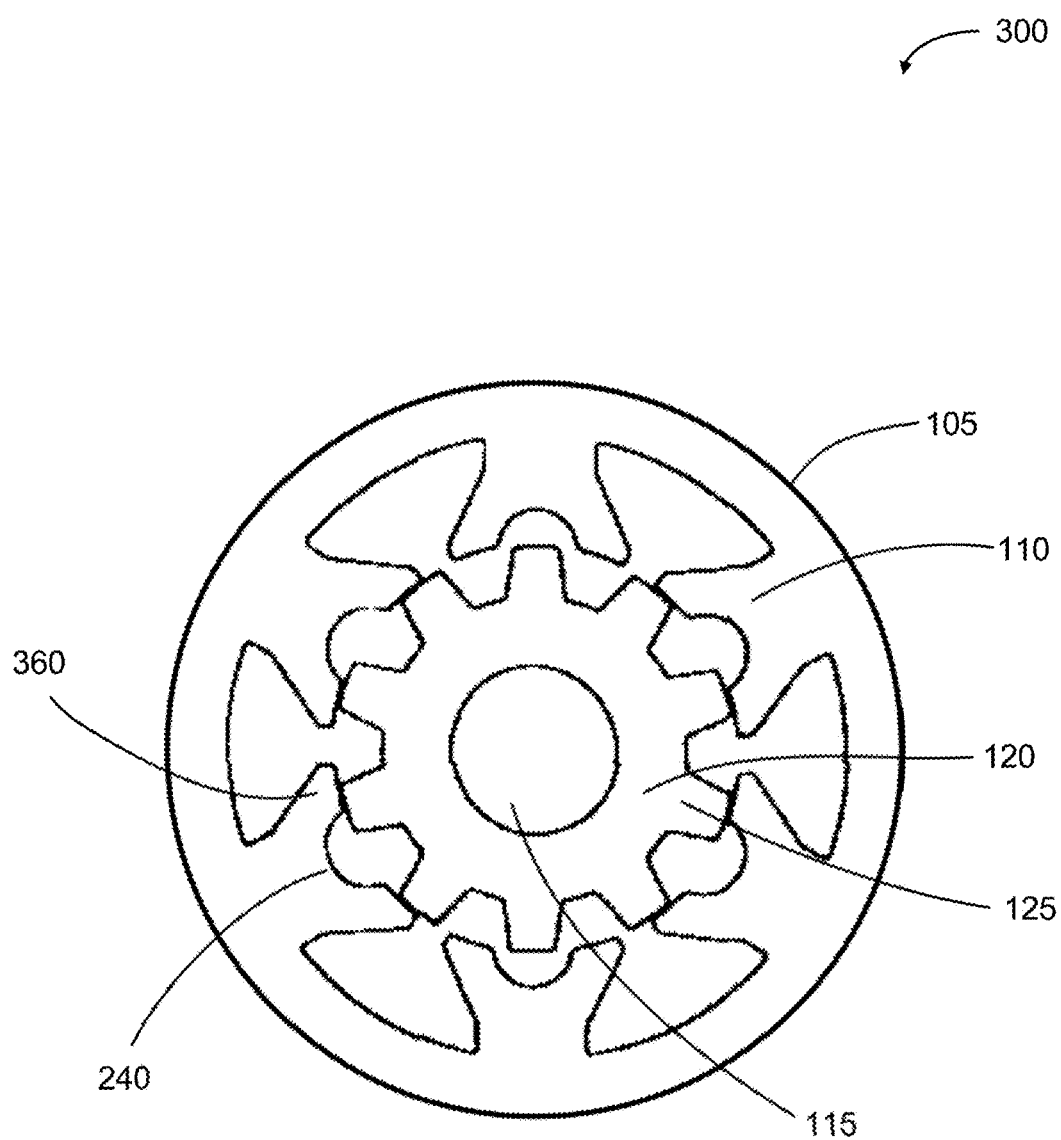
FIG. 3 shows a cross sectional view of a switched reluctance machine according to a further example.

Reference is next made to FIG. 3, which illustrates an example configuration of SRM, such as SRM 300. In particular, FIG. 3 shows the configuration of a multi-teeth SRM 300 including six (6) stator poles 110, twelve (12) stator teeth 360 and ten (10) rotor poles 125, i.e. a 6/12/10 SRM configuration.

Figure 4:
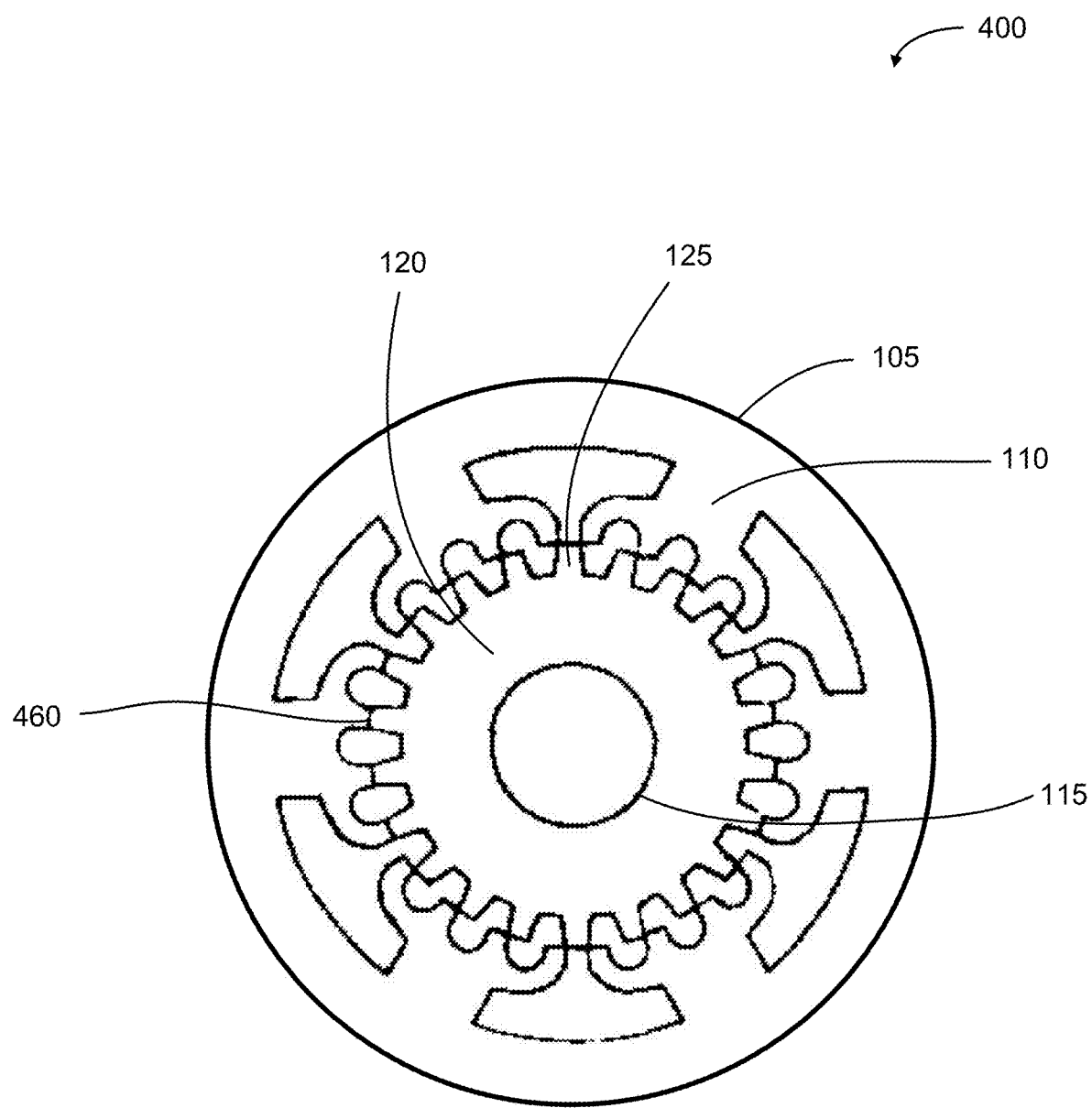
FIG. 4 shows a cross sectional view of a switched reluctance machine according to another example.

Reference is next made to FIG. 4, which illustrates an example configuration of SRM, such as SRM 400. In particular, FIG. 4 shows the configuration of a multi-teeth SRM 400 including six (6) stator poles 110, twenty-four (24) stator teeth 460 and twenty-two (22) rotor poles 125, i.e. a 6/24/22 SRM configuration.

Figure 5:
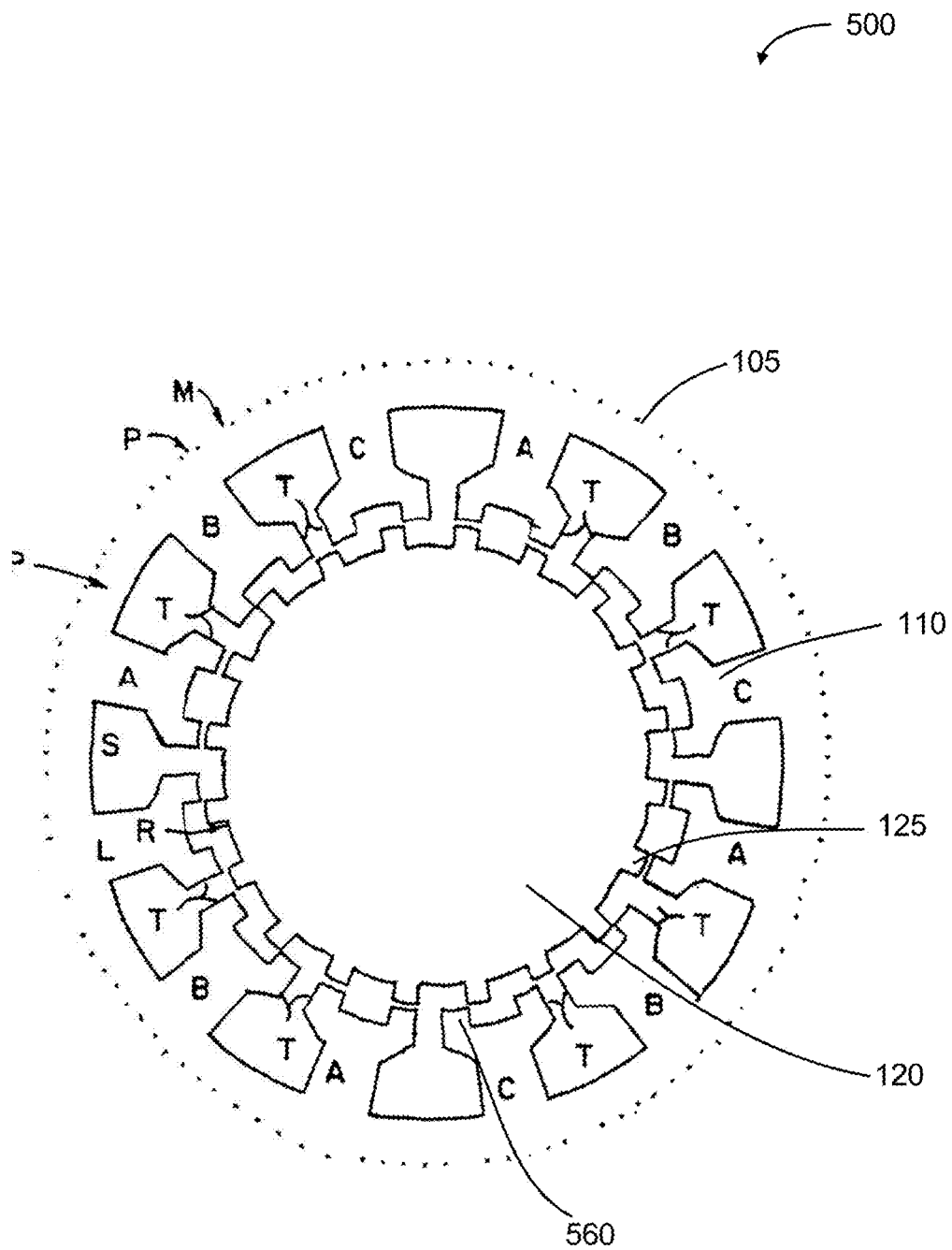
FIG. 5 shows a cross sectional view of a switched reluctance machine according to a further example.

FIG. 5 illustrates an example configuration of SRM, such as SRM 500. In particular, FIG. 5 shows the configuration of a multi-teeth SRM 500 including twelve (12) stator poles 110, twenty-four (24) stator teeth 560 and twenty (20) rotor poles 125, i.e. a 12/24/20 SRM configuration.

Figure 6:
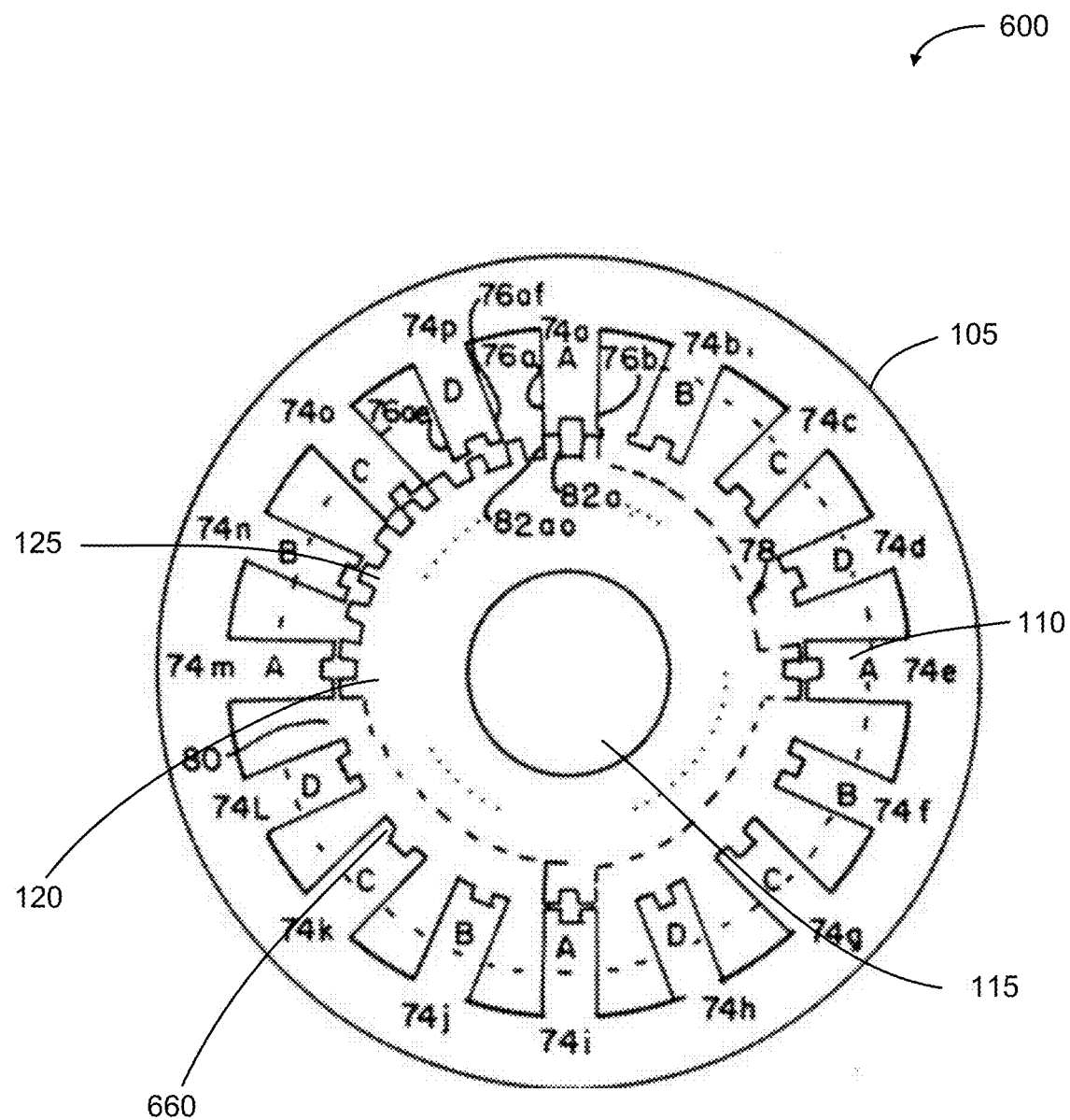
FIG. 6 shows a cross sectional view of a switched reluctance machine according to another example.

Reference is next made to FIG. 6, which illustrates an example configuration of SRM, such as SRM 600. In particular, FIG. 6 shows the configuration of a multi-teeth SRM 600 including twelve (6) stator poles 110, twenty-four (24) stator teeth 660 and thirty-two (32) rotor poles 125, i.e. a 12/24/32 SRM configuration.

Figure 7:
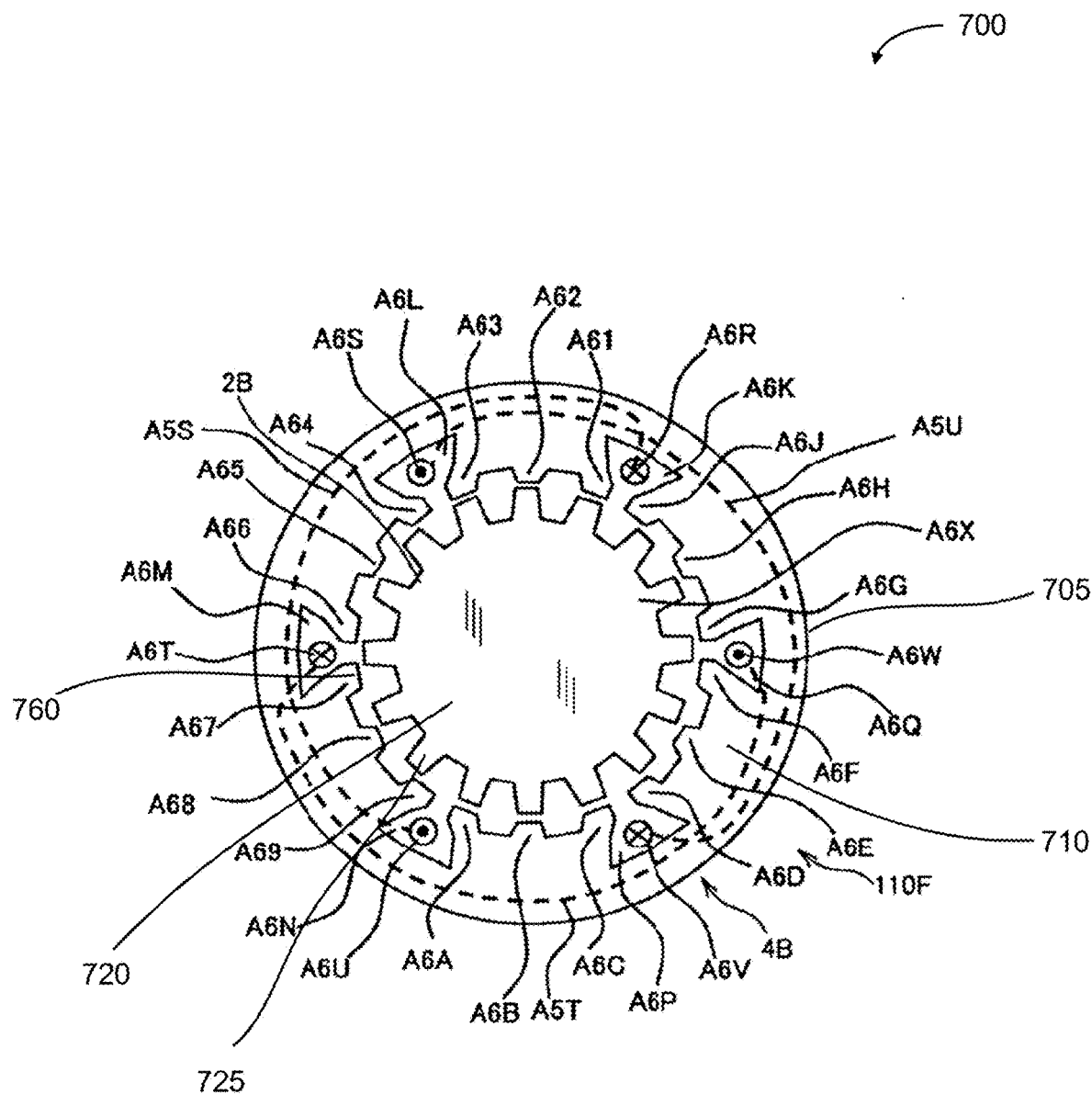
FIG. 7 shows a cross sectional view of a switched reluctance machine according to a further example.

FIG. 7 illustrates an example configuration of SRM, such as SRM 700. In particular, FIG. 7 shows the configuration of a multi-teeth SRM 700 including six (6) stator poles 110, eighteen (18) stator teeth 760 and sixteen (16) rotor poles 125, i.e. a 6/18/16 SRM configuration.

The multi-teeth SRMs 300 to 700 show various configurations where each stator pole 110 has multi-teeth and tooth-tips, which are bifurcated teeth or multi-bifurcated teeth. In most of these configurations illustrated in FIGS. 3-7, the total number of stator teeth is higher than the number of rotor poles.

Figure 8A:
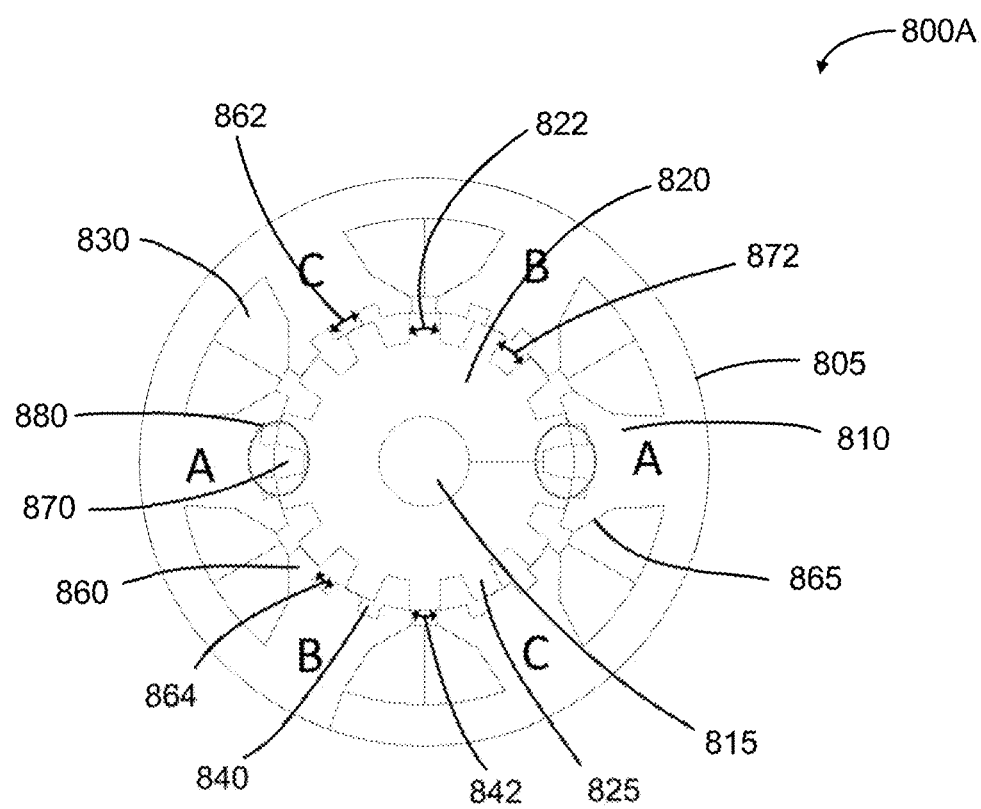
FIG. 8A shows a cross sectional view of a switched reluctance machine in an unaligned position according to an example.

Reference is next made to FIG. 8A, which shows an example configuration of SRM, such as SRM 800A. In particular, FIG. 8A shows the SRM configuration of a three-phase, multi-teeth SRM in an unaligned position. As illustrated, SRM 800A has a stator 805, a rotor 820, stator poles 810, rotor poles 825 and stator teeth 860. SRM 800 also has stator tooth-tips 865.

In the configuration of SRM 800A, coils 830 are wound around the stator poles 805 to provide a three-phase SRM. The SRM 800A has auxiliary slots 840, which do not have any copper windings.

FIG. 8A shows a fully unaligned position 880, where the center of a rotor slot 870 is aligned with the center of stator tooth 860. In this configuration, the greatest common divisor (GCD) of number of stator teeth 860 and the number of rotor poles 825 is equal to the number of stator poles per phase which are at the fully unaligned position 880.

While FIG. 8A shows an example of one stator teeth per pole being at the unaligned position 880 where the center of the rotor slot 870 is aligned with the center of stator teeth 860, there may be more than one stator teeth per pole in the unaligned position.

Figure 8B:
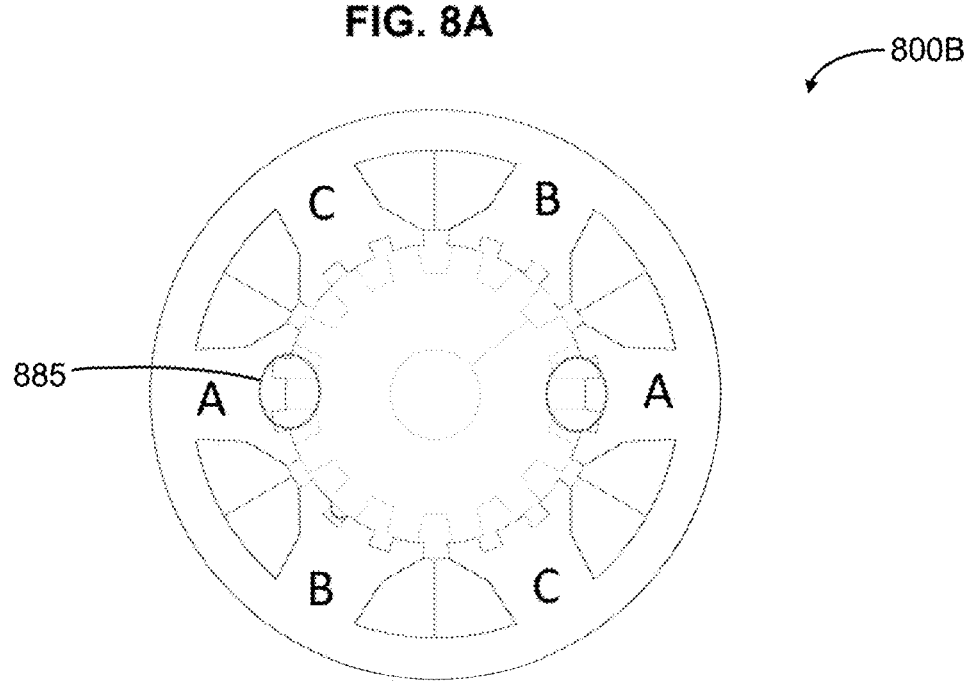
FIG. 8B shows a cross-sectional view of the switched reluctance machine of FIG. 8A in an aligned position according to an example.

FIG. 8B shows an example configuration of SRM, such as SRM 800B, in an aligned position 885. In the aligned position 885, the center of the rotor pole 825 is aligned with the center of the stator teeth 860. In this configuration, where the center of rotor pole 825 is aligned with the center of the stator teeth 860, the greatest common divisor of the number of stator teeth 860 and the number of rotor poles 825 is equal to the number of stator poles per phase which are at fully aligned position 885.

While FIG. 8B shows an example of one stator teeth per pole being at the aligned position 885 where the center of the rotor pole 825 is aligned with the center of stator teeth 860, there may be more than one stator teeth per pole in the aligned position.

In the embodiments of FIGS. 8A and 8B, the greatest common divisor of the number of stator teeth 860 and the number of rotor poles 825 is equal to the greatest common divisor of the number of stator poles 810 and the number of rotor poles 825. This may provide the advantage of maintaining a non-overlapping inductance profile in the SRMs 800A and 800B.

Also illustrated in FIG. 8A are stator slot angle 842, stator teeth angle 862, teeth opening angle 864, rotor slot angle 872 and rotor pole angle 822. As illustrated in SRM 800A, the SRM configuration has six (6) stator poles 810, eighteen (18) stator teeth 860, and fourteen (14) rotor poles 825, i.e. a 6/18/14 SRM configuration.

In the various embodiments disclosed herein, the relationship between the number of stator poles (Ns) 810, number of rotor poles (Nr) 825, number of phases (Nph), number of stator teeth (Nt) and number of teeth per stator pole (S) may be defined by equation (1).

$$N_s = \frac{N_t \times LCM(N_s, N_r)}{N_r \times N_{ph} \times S} \quad (1)$$

LCM (Ns, Nr) indicates the lowest common multiple of the number of stator poles and number of rotor poles.

In some cases, equation (1) along with one or more constraint conditions may define the relationship between the number of stator poles (Ns) 810, number of rotor poles (Nr) 825, number of phases (Nph), number of stator teeth (Nt) and number of teeth per stator pole (S), as discussed below.

Figure 8C:
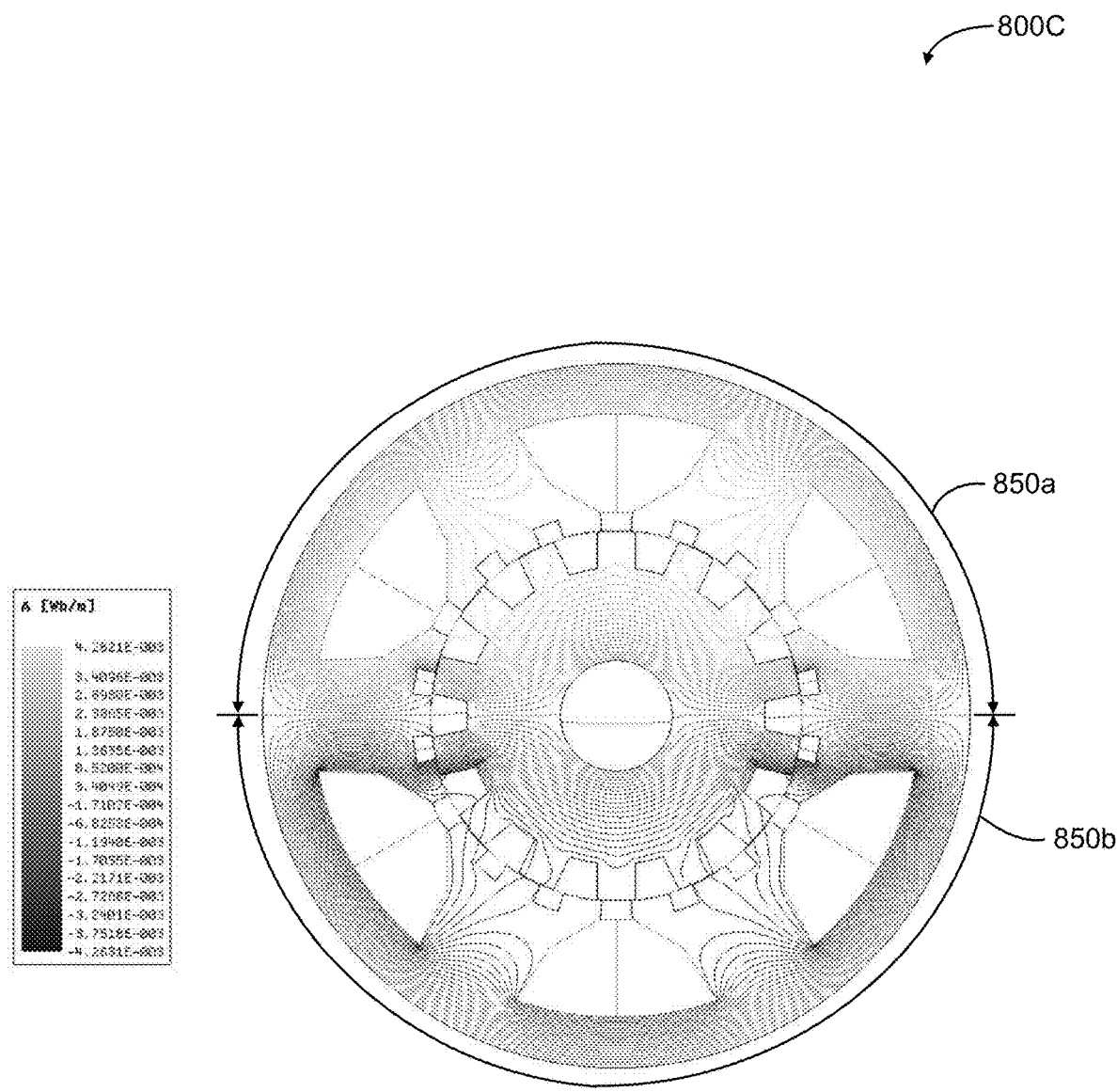
FIG. 8C shows an example of a flux pattern in the switched reluctance machine of FIG. 8A.

Reference is next made to FIG. 8C, which shows an SRM 800C with a 6/18/14 configuration having six (6) stator poles 810, eighteen (18) stator teeth 860, and fourteen (14) rotor poles 825. In particular, FIG. 8C shows the magnetic flux lines in the SRM 800C.

In the various embodiments disclosed herein, the number of machine periodicity may be found from the flux paths, based on equation (2) provided below. IN equation (2), Ns is number of stator poles, Nr is number of rotor poles and LCM (Ns, Nr) is the lowest common multiple of Ns and Nr:

$$MP = \frac{N_s N_r}{LCM(N_s, N_r)} \quad (2)$$

In the embodiment illustrated in FIGS. 8A-8C, the machine periodicity is 2 (i.e. (6*14)/42=2, using equation (2)). This is also seen in FIG. 8C, where there are two flux paths 850a and 850b in opposite directions.

Figure 9A:
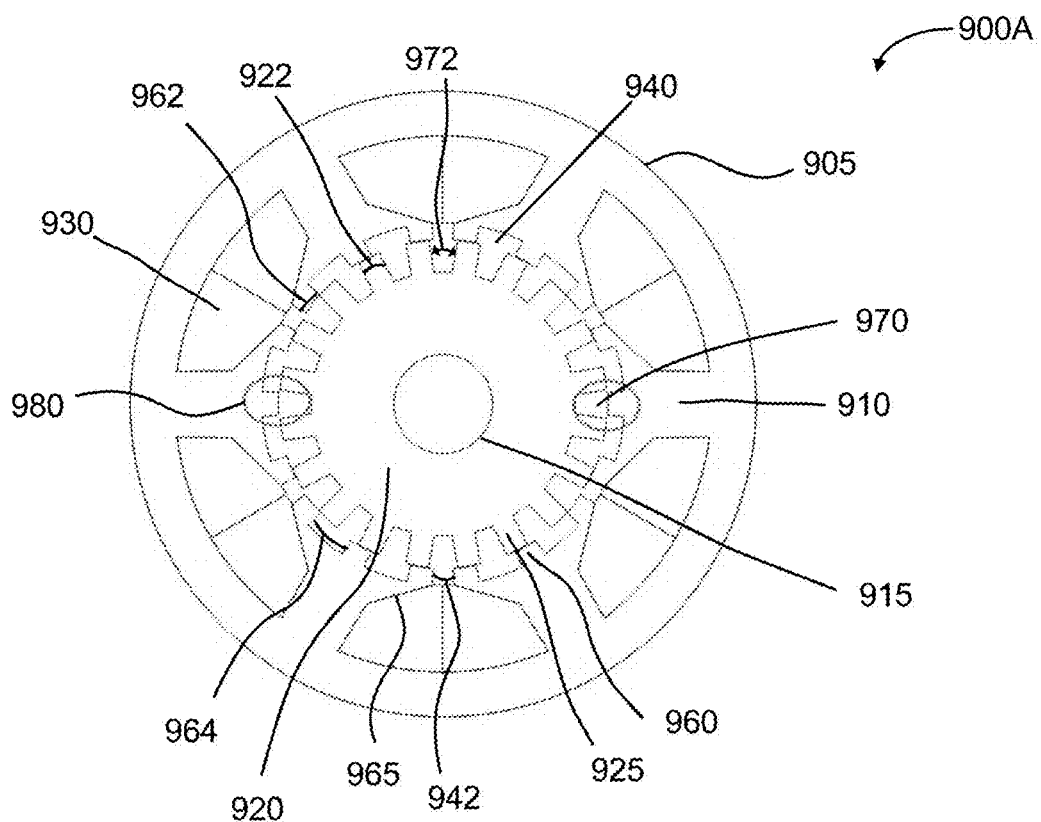
FIG. 9A shows a cross sectional view of a switched reluctance machine in one position according to an example.

Reference is next made to FIG. 9A, which shows an example cross-sectional view of SRM 900A. SRM 900A has a stator 905, a rotor 920, stator poles 910, rotor poles 925 and stator teeth 960. SRM 900 also has stator tooth-tips 965. In this embodiment, the SRM configuration has six (6) stator poles 910, eighteen (18) stator teeth 960, and twenty (20) rotor poles 925, i.e. a 6/18/20 SRM configuration.

In the configuration of SRM 900A, coils 930 are wound around the stator poles 905 to provide a three-phase SRM. The SRM 900A has auxiliary slots 940, which do not have any copper windings.

FIG. 9A shows a fully unaligned position 980, where the center of a rotor slot 970 is aligned with the center of stator tooth 960. In this configuration, the greatest common divisor (GCD) of number of stator teeth 960 and the number of rotor poles 925 is equal to the number of stator poles per phase which are at the fully unaligned position 980.

Figure 9B:
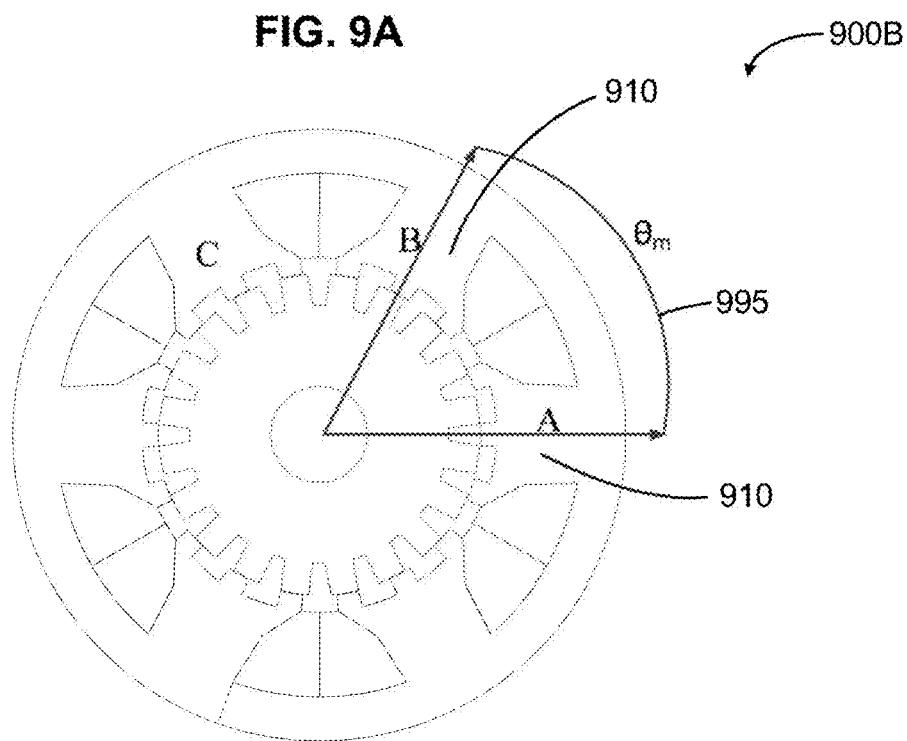
FIG. 9B shows a cross-sectional view of the switched reluctance machine of FIG. 8A in another position according to an example.

FIG. 9B shows an example configuration of SRM, such as SRM 900B. In particular, SRM 900B illustrates a mechanical angle ($\theta_m$) 995, which is equal to an angle between two stator poles 910.

In the embodiments illustrated in SRMs 900A and 900B, the number of machine periodicity may be determined based on a relationship between the machine angle ($\theta_m$) 995 and electrical angle ($\theta_e$), as shown in equation (3):

$$\theta_e = MP \cdot \theta_m \quad (3)$$

Equation (3) may be rearranged to provide equations (4) and (5):

$$\frac{2\pi}{N_{ph}} = MP \times \frac{2\pi}{N_s} = MP \times \frac{2\pi \times S}{N_t} \quad (4)$$

$$N_t = MP \times S \times N_{ph} \quad (5)$$

Based on equations (2) and (5), a relationship between a number of stator poles Ns, a number of rotor poles Nr, a number of stator teeth Nt, a number of phases Nph and a number of stator teeth per stator pole S may be determined using equation (1).

In the various embodiments illustrated herein, based on equation (1) and certain constraint conditions, a number of stator and rotor poles for various topologies of SRM, such as interior rotor, exterior rotor and axial flux SRM etc., may be determined.

Constraint conditions may include one or more of equations (6)-(12) provided below:

If $|N_s-N_r|=2p_1$ and $|N_t-N_r|=2p_2$; $p_1>p_2$ and $\mathrm{mod}(p1, p2)=0$ (6)

$GCD(N_s,N_r)=GCD(N_p,N_r)$ (7)

$GCD(N_p,N_r)$=Number of stator pole per phase which is at unaligned position (8)

$2N_s + 2 \neq N_r$ if $S = 2$ (9)

$N_t-4 \neq N_r$ if $S = 2$ and $N_{ph} = 3$ (10)

$N_t-2 \neq N_r$ if $N_{ph} = 3$ (11)

$$\left(\frac{360-\frac{360\times N_s}{N_r}}{N_s}\right)-\frac{360\times \beta}{N_r}>\frac{180}{N_s}$$ (12)

In equation (12), the value of β may be approximately between 0.35 and 0.4 if the number of rotor poles (Nr) is greater than the number of stator teeth (Nt).

In addition to constraints shown in equations (6)-(12), certain geometric constraints may also apply. For example, one example of a geometric constraint is that the length of the gap between the rotor poles is larger than the arc length of the stator teeth to maintain unaligned position. In another example of a geometric constraint, the rotor pole arc length and stator teeth arc length are each larger than or equal to $$\frac{2\pi}{N_r N_{ph}}$$

to maintain non-overlapping inductance.

FIG. 9A also shows a stator slot angle 942, a stator teeth angle 962, a teeth opening angle 964, a rotor slot angle 972 and a rotor pole angle 922.

Figure 9C:
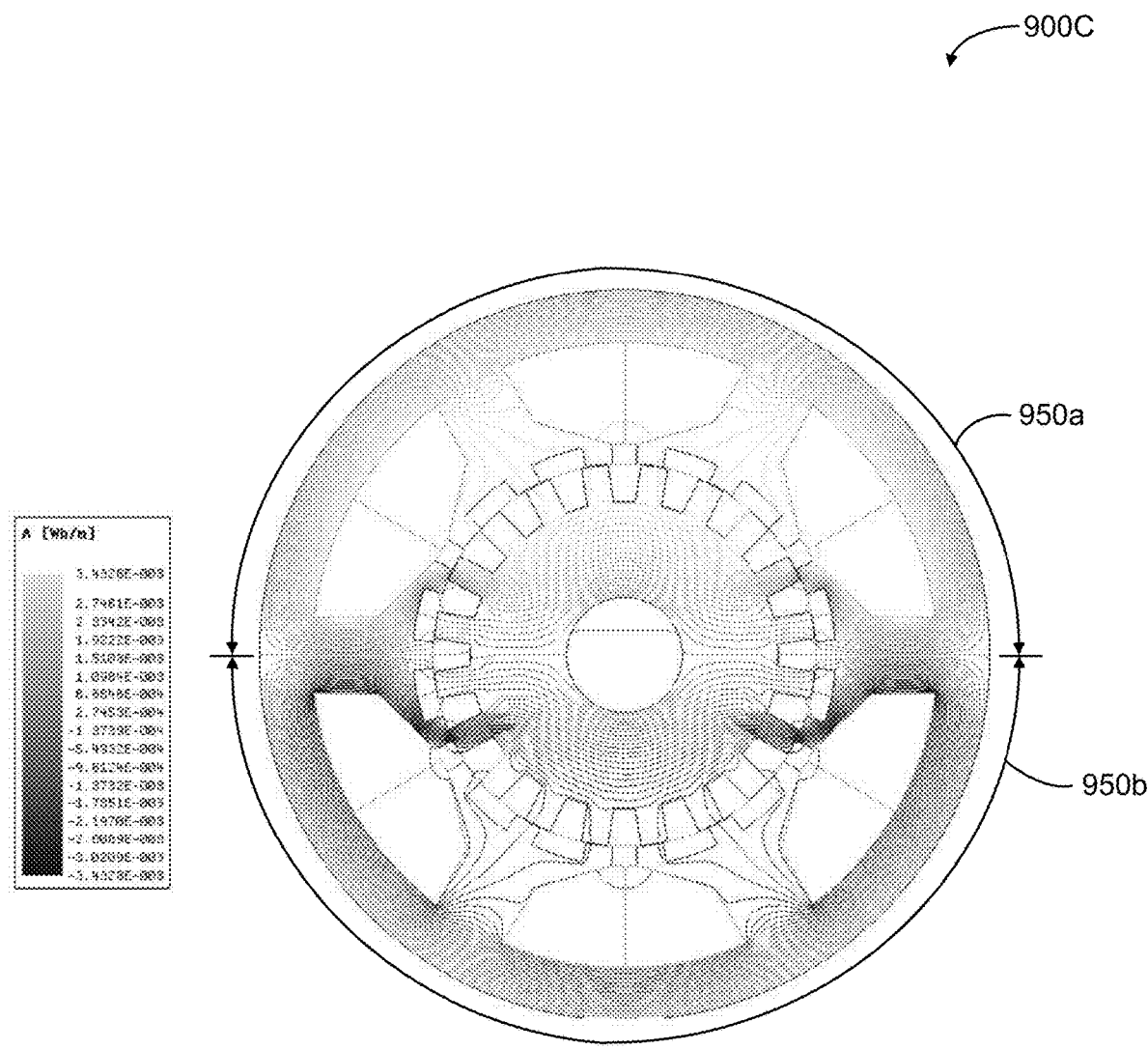
FIG. 9C shows an example of a flux pattern in the switched reluctance machine of FIG. 9A.

Reference is next made to FIG. 9C, which shows an SRM 900C with a 6/18/20 configuration having six (6) stator poles 910, eighteen (18) stator teeth 960, and twenty (20) rotor poles 925. In particular, FIG. 9C shows the magnetic flux lines in the SRM 900C.

In the embodiment illustrated in FIGS. 9A-9C, the machine periodicity is 2 (i.e. (6*20)/60=2 based on equation (2)). This is also seen in FIG. 9C, where there are two flux paths 950a and 950b in opposite directions.

Figure 10A:
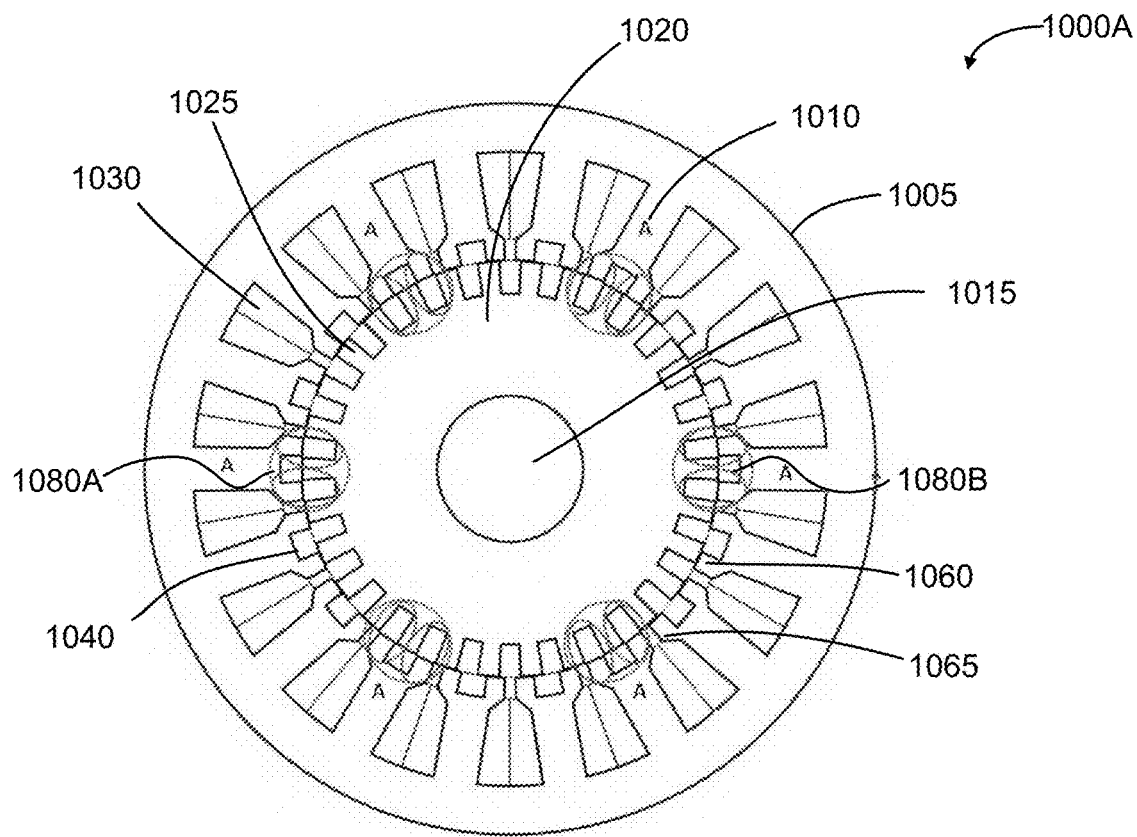
FIG. 10A shows a cross sectional view of a switched reluctance machine in one position according to an example.

Reference is next made to FIG. 10A, which shows an example cross-sectional view of SRM 1000A. SRM 1000A has a stator 1005, a rotor 1020, stator poles 1010, rotor poles 1025 and stator teeth 1060. SRM 1000 also has stator tooth-tips 1065.

In the configuration of SRM 1000A, coils 1030 are wound around the stator poles 1005 to provide a three-phase SRM. However, the SRM 1000A has an auxiliary slot 1040, which does not have any copper windings.

As illustrated in SRM 1000A, the SRM configuration has eighteen (18) stator poles 1010, thirty-six (36) stator teeth 1060, and thirty (30) rotor poles 1025, i.e. an 18/36/30 SRM configuration.

FIG. 10A shows the number of stator poles in an unaligned position 1080A. As well, FIG. 10A shows the number of stator teeth at the position 1080B where the center of the rotor slot 1070 is aligned with the center of stator tooth per pole 1060.

Figure 10B:
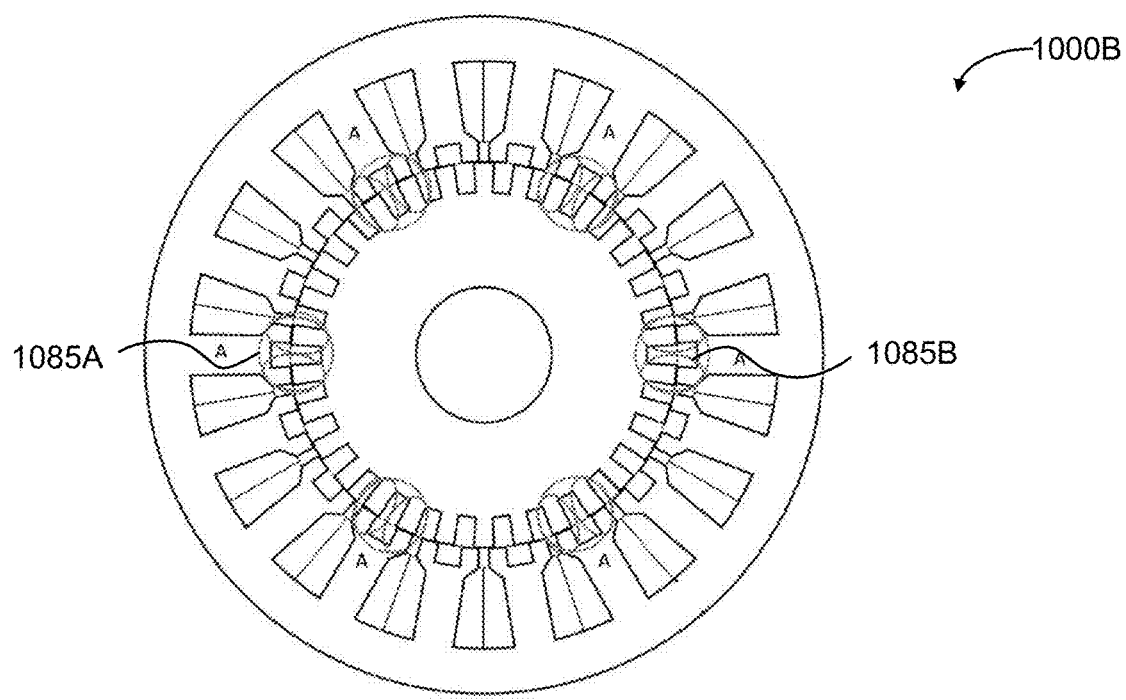
FIG. 10B shows a cross-sectional view of the switched reluctance machine of FIG. 10A in another position according to an example.

Reference is next made to FIG. 10B, which shows an example cross-section view of SRM 1000B, analogous to SRM 1000A, in an aligned position. SRM 1000B shows the number of stator poles at aligned position 1085A. SRM 1000B also shows the number of stator teeth at the position 1085B where the center of the rotor pole 1025 is aligned with the center of stator tooth per pole 1060.

Figure 10C:
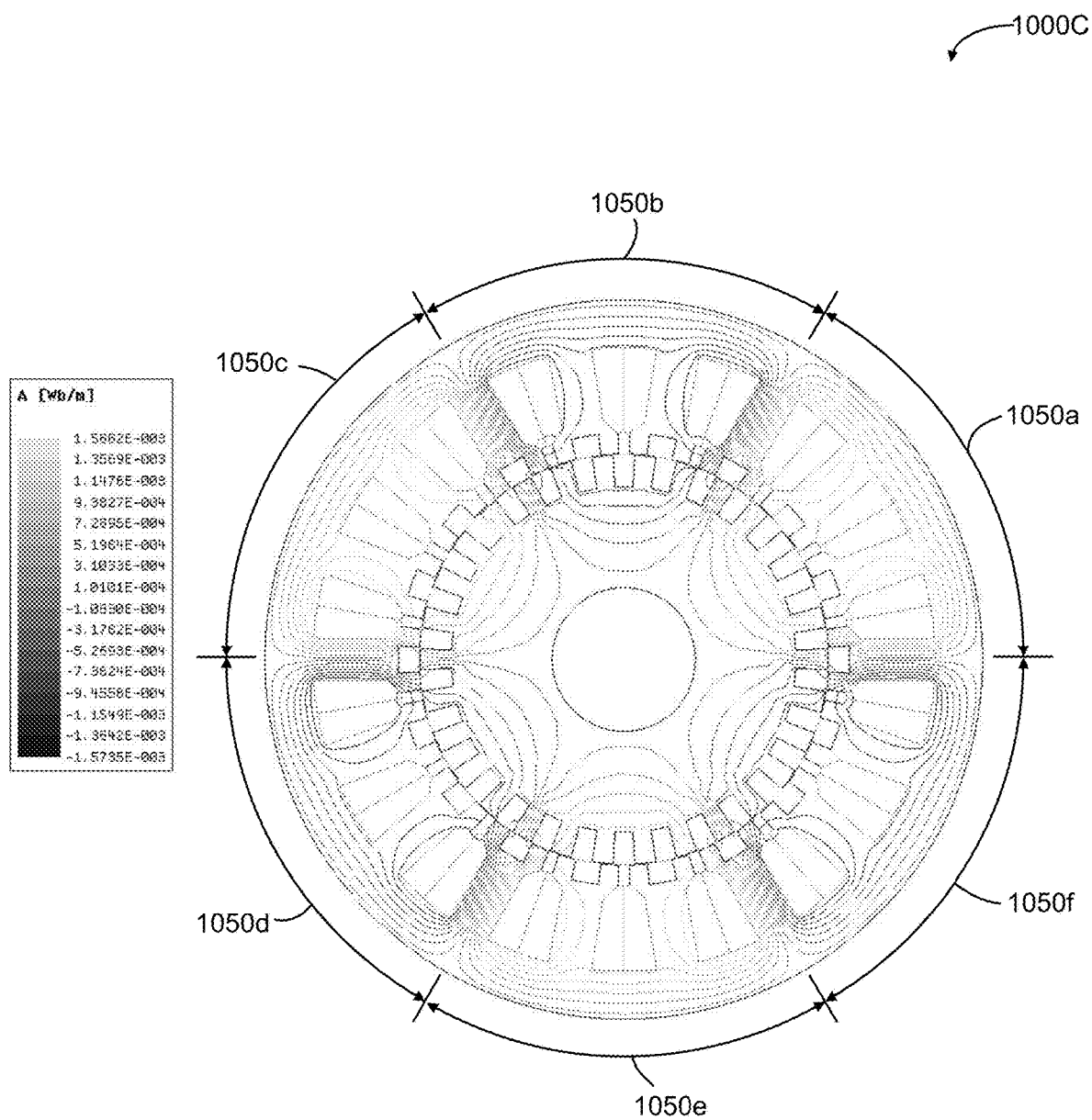
FIG. 10C shows an example of a flux pattern in the switched reluctance machine of FIG. 10A.

Reference is next made to FIG. 10C, which shows an SRM 1000C with an 18/36/30 configuration having eighteen (18) stator poles 1010, thirty-six (36) stator teeth 1060, and thirty (30) rotor poles 1025. In particular, FIG. 1000C shows the magnetic flux lines in the SRM 1000C.

In the embodiment illustrated in FIGS. 10A-10C, the machine periodicity is 6 (i.e. (18*30)/90=6 based on equation (2)). This is also seen in FIG. 10C, where there are six flux paths 1050a, 1050b, 1050c, 1050d, 1050e and 1050f in opposite directions.

Figure 11A:
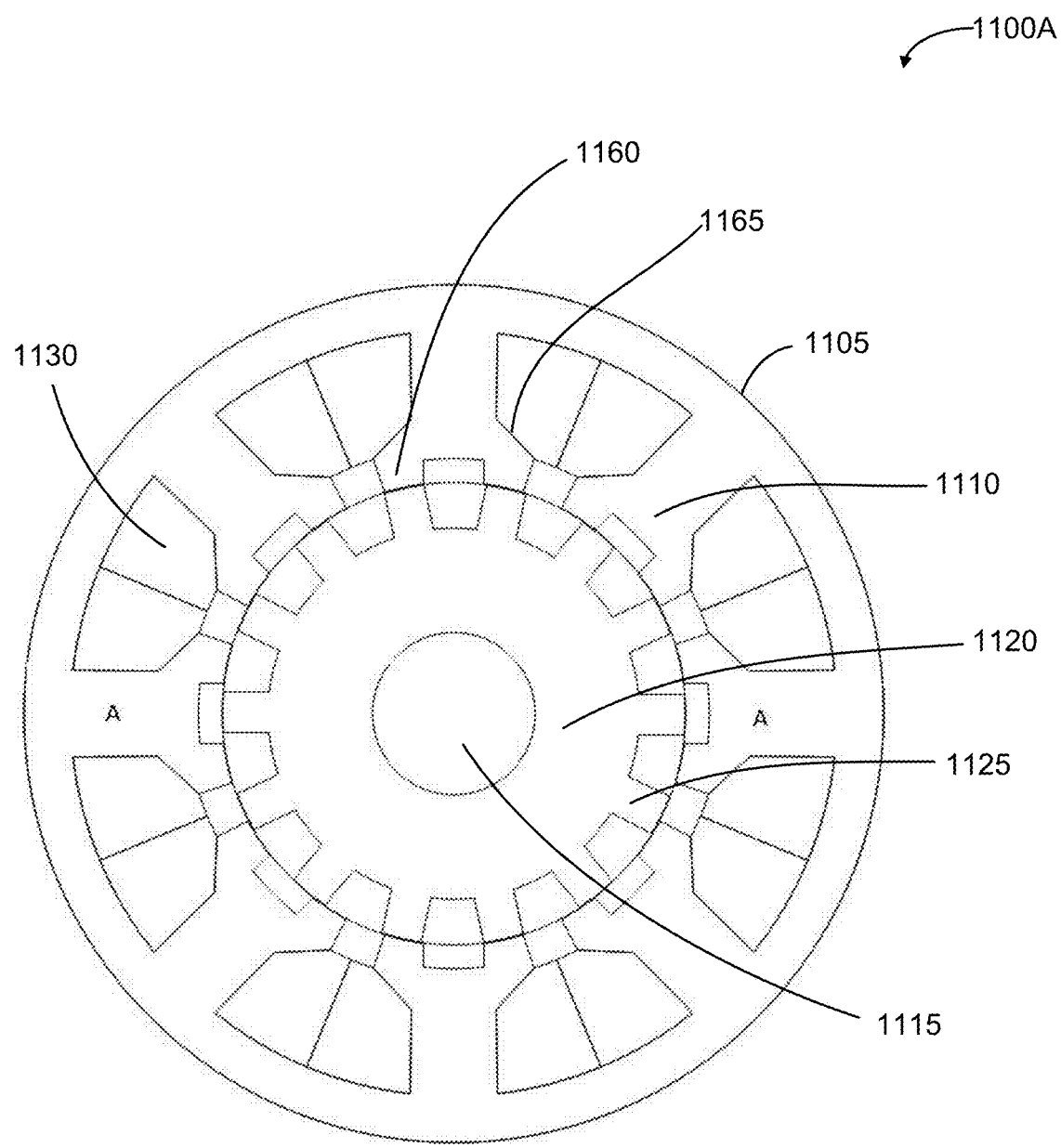
FIG. 11A shows a cross sectional view of a switched reluctance machine according to an example.

Reference is next made to FIG. 11A, which shows an example cross-sectional view of SRM 1100A. SRM 1100A has a stator 1105, a rotor 1120, stator poles 1110, rotor poles 1125 and stator teeth 1160. SRM 1100 also has stator tooth-tips 1165.

In the configuration of SRM 1100A, coils 1130 are wound around the stator poles 1105 to provide a four-phase SRM. However, the SRM 1100A has an auxiliary slot 1140, which does not have any copper windings.

As illustrated in SRM 1100A, the SRM configuration has eight (8) stator poles 1110, sixteen (16) stator teeth 1160, and fourteen (14) rotor poles 1125, i.e. an 8/16/14 SRM configuration.

Figure 11B:
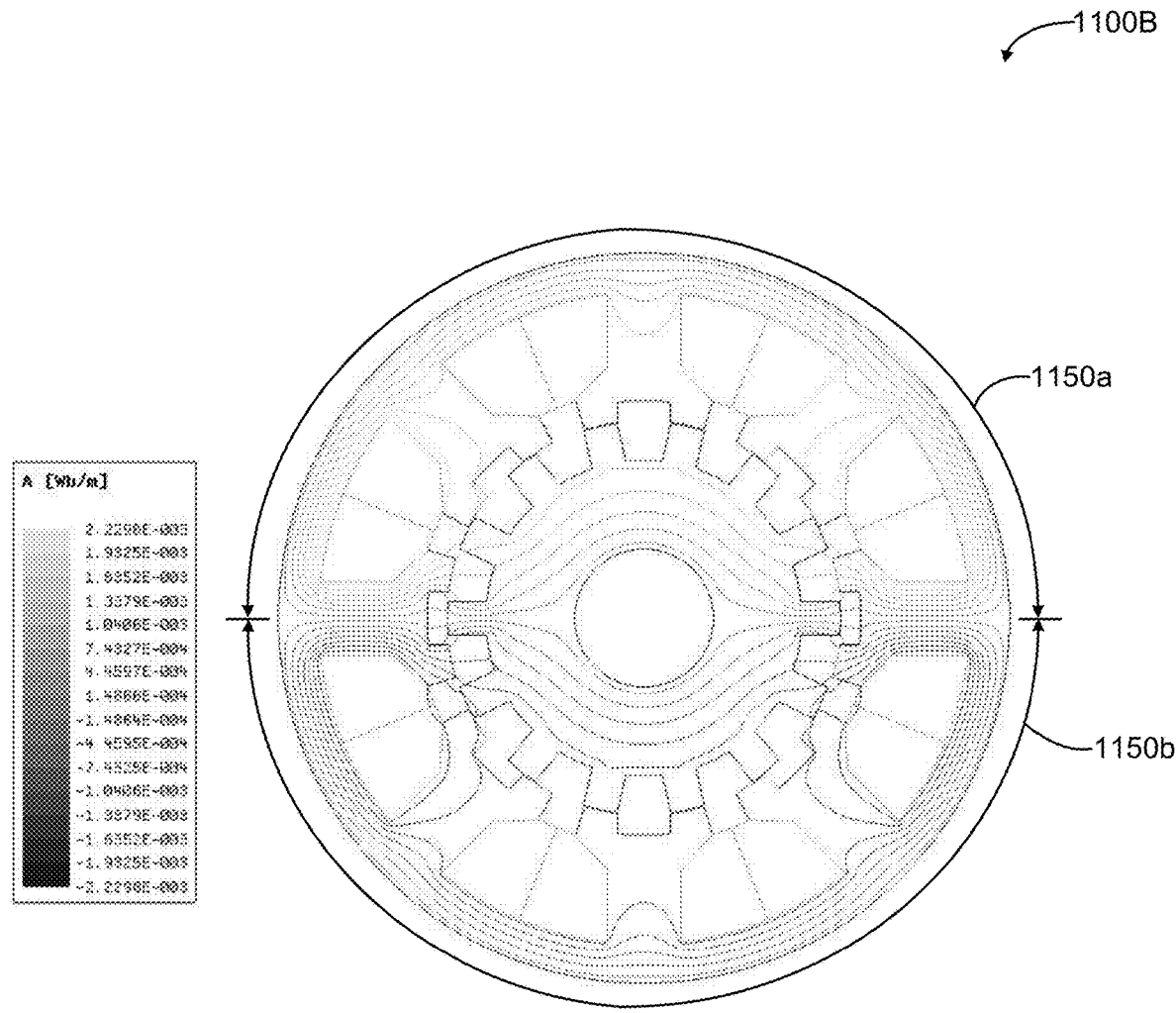
FIG. 11B shows an example of a flux pattern in the switched reluctance machine of FIG. 11A.

Reference is next made to FIG. 11B, which shows an SRM 1100B with an 8/16/14 configuration having eight (8) stator poles 1110, sixteen (16) stator teeth 1160, and fourteen (14) rotor poles 1125. In particular, FIG. 11B shows the magnetic flux lines in the SRM 1100B.

In the embodiment illustrated in FIGS. 11A-11B, the machine periodicity is 2 (i.e. (8*14)/56=2 based on equation (2)). This is also seen in FIG. 11B, where there are two flux paths 1150a and 1150b in opposite directions.

Figure 12A:
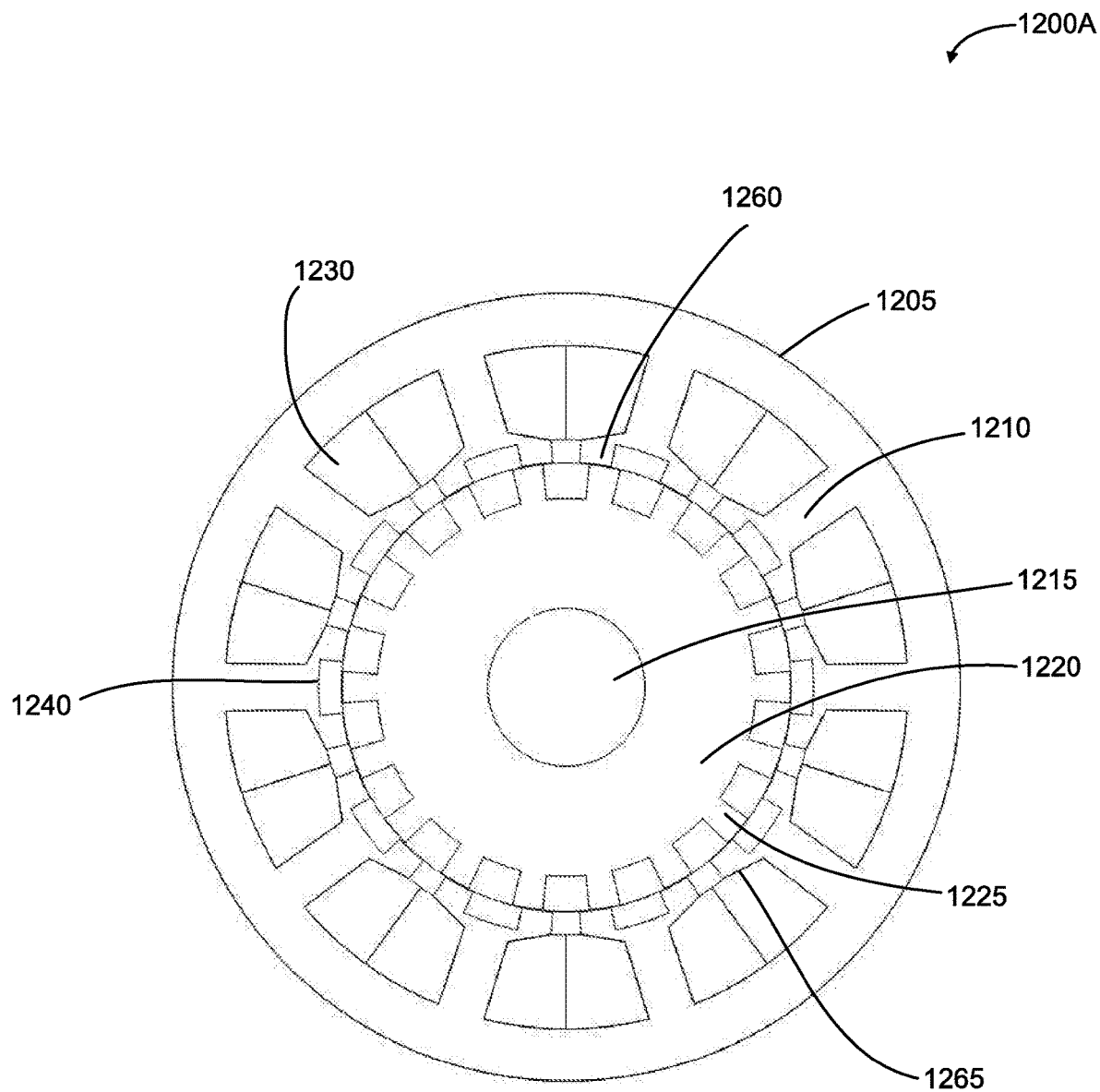
FIG. 12A shows a cross sectional view of a switched reluctance machine according to an example.

Reference is next made to FIG. 12A, which shows an example cross-sectional view of SRM 1200A. SRM 1200A has a stator 1205, a rotor 1220, stator poles 1210, rotor poles 1225 and stator teeth 1260. SRM 1200 also has stator tooth-tips 1265.

In the configuration of SRM 1200A, coils 1230 are wound around the stator poles 1205 to provide a five-phase SRM. However, the SRM 1200A has an auxiliary slot 1240, which does not have any copper windings.

As illustrated in SRM 1200A, the SRM configuration has ten (10) stator poles 1210, twenty (20) stator teeth 1260, and eighteen (18) rotor poles 1225, i.e. an 10/20/18 SRM configuration.

Figure 12B:
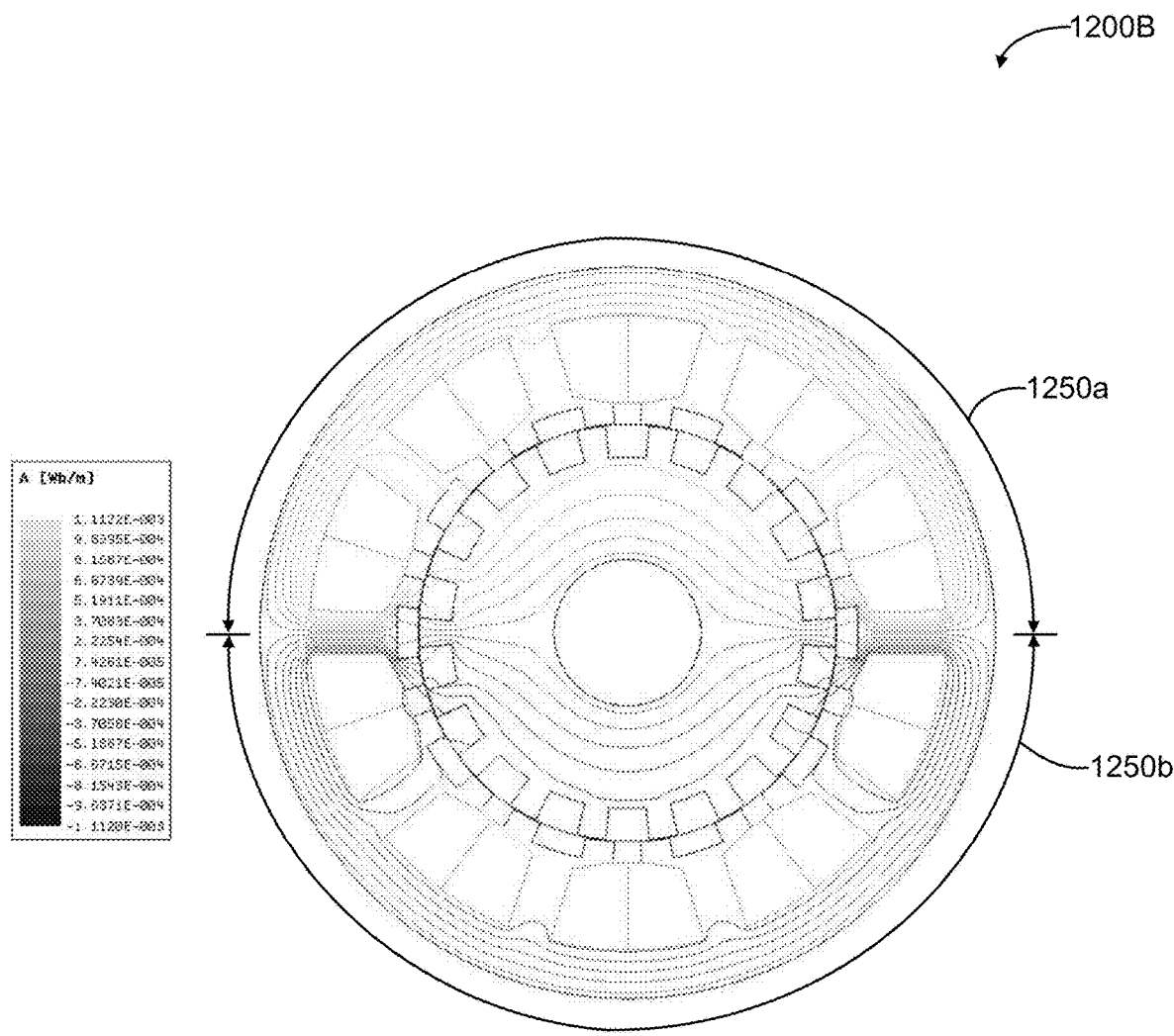
FIG. 12B shows an example of a flux pattern in the switched reluctance machine of FIG. 12A.

Reference is next made to FIG. 12B, which shows an SRM 1200B with an 10/20/18 configuration having ten (10) stator poles 1210, twenty (20) stator teeth 1260, and eighteen (18) rotor poles 1225. In particular, FIG. 12B shows the magnetic flux lines in the SRM 1200B.

In the embodiment illustrated in FIGS. 12A-12B, the machine periodicity is 2 (i.e. (10*18)/90=2 based on equation (2)). This is also seen in FIG. 12B, where there are two flux paths 1250a and 1250b in opposite directions.

Various SRM configurations determined based on equation (1) are provided below. Table 1 provides SRM configurations for three-phase, multi-teeth SRMs:

| $N_{ph}$ | $N_s$ | $N_t$ | $N_r$ | Novel multi-teeth SRM |
|---|---|---|---|---|
| 3 | 6 | 18 | 14 | 6/18/14 |
|   | 6 | 18 | 20 | 6/18/20 |
|   | 6 | 18 | 22 | 6/18/22 |
|   | 6 | 24 | 26 | 6/24/26 |
|   | 6 | 30 | 22 | 6/30/22 |
|   | 6 | 30 | 26 | 6/30/26 |
|   | 6 | 30 | 32 | 6/30/32 |
|   | 6 | 30 | 34 | 6/30/34 |
|   | 6 | 30 | 38 | 6/30/38 |
|   | 6 | 36 | 26 | 6/36/26 |
|   | 6 | 36 | 38 | 6/36/38 |
|   | 6 | 42 | 38 | 6/42/38 |
|   | 12 | 36 | 40 | 12/36/40 |
|   | 18 | 36 | 30 | 18/36/30 |

Table 2 provides SRM configurations for four-phase, multi-teeth SRMs:

| $N_{ph}$ | $N_s$ | $N_t$ | $N_r$ | Novel multi-teeth SRM |
|---|---|---|---|---|
| 4 | 8 | 16 | 14 | 8/16/14 |
|   | 8 | 24 | 22 | 8/24/22 |
|   | 8 | 24 | 26 | 8/24/26 |
|   | 8 | 32 | 26 | 8/32/26 |
|   | 8 | 32 | 30 | 8/32/30 |
|   | 8 | 32 | 34 | 8/32/34 |
|   | 8 | 40 | 38 | 8/40/38 |
|   | 8 | 40 | 42 | 8/40/42 |
|   | 16 | 32 | 28 | 16/32/28 |

Table 3 provides SRM configurations for five-phase, multi-teeth SRMs:

| $N_{ph}$ | $N_s$ | $N_t$ | $N_r$ | Novel multi-teeth SRM |
|---|---|---|---|---|
| 5 | 10 | 20 | 18 | 10/20/18 |
|   | 10 | 30 | 26 | 10/30/26 |
|   | 10 | 40 | 46 | 10/40/46 |
|   | 20 | 40 | 36 | 20/40/36 |

While the present application has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

The invention claimed is:

1. A switched reluctance machine comprising:
an axially extending shaft;
an axially extending rotor mounted to the shaft, the rotor having a plurality of salient rotor poles;
an axially extending stator disposed coaxially and concentrically with the rotor, the stator having a plurality of salient stator poles protruding radially from the stator towards the rotor poles, the stator further having a plurality of stator teeth and tooth-tips; and
a plurality of electrical coils wound about the stator poles, the plurality of electrical coils including a plurality of separate phase coils defining a plurality of phases of the switched reluctance machine,
wherein a number of stator poles is related to a number of rotor poles, a number of stator teeth, a number of stator teeth per stator pole, and a number of phases, according to equation (1) and at least one constraint condition:

$$N_s = \frac{N_t \times LCM(N_s, N_r)}{N_r \times N_{ph} \times S} \quad (1)$$

wherein $$S = \frac{N_t}{N_s},$$

and
wherein the at least one constraint condition comprises equations (2)-(4):

$$\text{if } S=2, \text{ then } 2N_s+2 \neq N_r, \quad (2)$$

$$\text{if } N_{ph}=3, \text{ then } N_t - 2 \neq N_r, \quad (3)$$

$$\text{if } N_{ph}=3 \text{ and } S=2, \text{ then } N_t - 4 \neq N_r, \quad (4),$$

wherein $N_s$ is the number of stator poles, $N_r$ is the number of rotor poles, $N_t$ is the number of stator teeth, $N_{ph}$ is the number of phases, S is the number of stator teeth per stator pole, and LCM is the lowest common multiple of number of stator poles and number of rotor poles.

2. The switched reluctance machine of claim 1, wherein the at least one constraint condition further comprises equation (5):

$$\text{If } |N_s-N_r|=2p_1 \text{ and } |N_t-N_r|=2p_2; \ p_1>p_2 \text{ and } \mod(p1, p2)=0 \quad (5).$$

3. The switched reluctance machine of claim 1, wherein the at least one constraint condition further comprises equation (6):

$$GCD(N_s,N_r)=GCD(N_t,N_r) \quad (6).$$

4. The switched reluctance machine of claim 1, wherein the at least one constraint condition further comprises equation (7):

$$GCD(N_p,N_r)=\text{Number of stator pole per phase which is at unaligned position} \quad (7).$$

5. The switched reluctance machine of claim 1, wherein the at least one constraint condition further comprises equation (8), wherein β is any value between a range of about 0.35 and 0.4 if $N_r > N_t$:

$$\left(\frac{360 - \frac{360 \times N_s}{N_r}}{N_s}\right) - \frac{360 \times \beta}{N_r} > \frac{180}{N_s}. \quad (8)$$

6. The switched reluctance machine of claim 1, wherein the at least one constraint condition further comprises a higher length of gap between adjacent rotor poles of the plurality of rotor poles than an arc length of a stator teeth to maintain an unaligned position.

7. The switched reluctance machine of claim 1, wherein the at least one constraint condition further comprises a rotor pole arc length and a stator teeth arc length, each being larger than or equal to $$\frac{2\pi}{N_r N_{ph}}$$

to maintain non-overlapping inductance.

8. A method of manufacturing a switched reluctance machine having an axially extending shaft, an axially extending rotor mounted to the shaft, an axially extending stator disposed coaxially and concentrically with the rotor, the rotor having a plurality of salient rotor poles, the stator having a plurality of salient stator poles protruding radially from the stator towards the rotor poles, the stator further having a plurality of stator teeth and tooth-tips, the switched reluctance machine further having a plurality of electrical coils wound about the stator poles to define a plurality of phases of the switched reluctance machine, the method comprising:

determining a number of stator poles according to equation (1) and at least one constraint condition:

$$N_s = \frac{N_t \times LCM(N_s, N_r)}{N_r \times N_{ph} \times S} \qquad (1)$$

wherein $$S = \frac{N_t}{N_s},$$

and wherein the at least one constraint condition comprises equations (2)-(4):

if $S=2$, then $2N_s+2 \neq N_r$, (2)

if $N_{ph}=3$, then $N_t-2 \neq N_r$, (3)

if $N_{ph}=3$ and $S=2$, then $N_t-4 \neq N_r$, (4), wherein $N_s$ is a number of stator poles, $N_r$ is a number of rotor poles, $N_t$ is a number of stator teeth, $N_{ph}$ is a number of phases, S is a number of stator teeth per stator pole, and LCM is a lowest common multiple of number of stator poles and number of rotor poles.

9. The method of claim 8, wherein the at least one constraint condition further comprises equation (5):

If $|N_s-N_r|=2p_1$ and $|N_t-N_r|=2p_2$; $p_1>p_2$ and mod($p1$, $p2$)=0 (5).

10. The method of claim 8, wherein the at least one constraint condition further comprises equation (6):

$GCD(N_s,N_r)=GCD(N_t,N_r)$ (6).

11. The method of claim 8, wherein the at least one constraint condition further comprises equation (7):

$GCD(N_t,N_r)$=Number of stator pole per phase which is at unaligned position (7).

12. The method of claim 8, wherein the at least one constraint condition further comprises equation (8), wherein β is any value between a range of about 0.35 and 0.4 if $N_r>N_t$:

$$\left(360 - \frac{360 \times N_s}{N_r}\right) \frac{1}{N_s} - \frac{360 \times \beta}{N_r} > \frac{180}{N_s}. \qquad (8)$$

13. The method of claim 8, wherein the at least one constraint condition further comprises a higher length of gap between adjacent rotor poles of the plurality of rotor poles than an arc length of a stator teeth to maintain an unaligned position.

14. The method of claim 8, wherein the at least one constraint condition further comprises a rotor pole arc length and a stator teeth arc length, each being larger than or equal to $$\frac{2\pi}{N_r N_{ph}}$$

to maintain non-overlapping inductance.

* * * * *